(12) United States Patent
Wang et al.

(10) Patent No.: US 11,003,831 B2
(45) Date of Patent: May 11, 2021

(54) AUTOMATICALLY PAIRING FONTS USING ASYMMETRIC METRIC LEARNING

(71) Applicant: Adobe Inc., San Jose, CA (US)

(72) Inventors: Zhaowen Wang, San Jose, CA (US); Hailin Jin, San Jose, CA (US); Aaron Phillip Hertzmann, San Francisco, CA (US); Shuhui Jiang, Boston, MA (US)

(73) Assignee: ADOBE INC., San Jose, CA (US)

( * ) Notice: Subject to any disclaimer, the term of this patent is extended or adjusted under 35 U.S.C. 154(b) by 819 days.

(21) Appl. No.: 15/729,855

(22) Filed: Oct. 11, 2017

(65) Prior Publication Data

US 2019/0108203 A1 Apr. 11, 2019

(51) Int. Cl.
| | |
|---|---|
| *G06F 40/109* | (2020.01) |
| *G06N 3/04* | (2006.01) |
| *G06K 9/62* | (2006.01) |
| *G06F 9/451* | (2018.01) |
| *G06N 3/08* | (2006.01) |

(52) U.S. Cl.
CPC .......... *G06F 40/109* (2020.01); *G06F 9/453* (2018.02); *G06K 9/6215* (2013.01); *G06K 9/6256* (2013.01); *G06N 3/04* (2013.01); *G06N 3/0454* (2013.01); *G06N 3/08* (2013.01)

(58) Field of Classification Search
CPC .......... G06N 3/08; G06N 3/04; G06N 3/0454; G06F 40/109; G06F 40/279; G06F 9/453; G06K 9/6828; G06K 9/6215; G06K 9/6256
See application file for complete search history.

(56) References Cited

U.S. PATENT DOCUMENTS

| | | | | |
|---|---|---|---|---|
| 2011/0289407 | A1* | 11/2011 | Naik | G06F 40/109 715/269 |
| 2016/0171343 | A1* | 6/2016 | Kaasila | G06K 9/6828 345/471 |
| 2016/0307347 | A1* | 10/2016 | Matteson | G06F 40/109 |

FOREIGN PATENT DOCUMENTS

| | | |
|---|---|---|
| EP | 2 857 983 A2 | 4/2015 |
| KR | 101611895 B1 | 4/2016 |
| WO | WO 2016/167919 A2 | 10/2016 |

OTHER PUBLICATIONS

Q. Cao, Y. Ying, and P. Li. Similarity metric learning for face recognition. In Proceedings of the IEEE International Conference on Computer Vision, pp. 2408-2415, 2013. (Year: 2013).*

(Continued)

*Primary Examiner* — Miranda M Huang
*Assistant Examiner* — Yao D Huang
(74) *Attorney, Agent, or Firm* — Keller Jolley Preece

(57) ABSTRACT

The present disclosure relates to an asymmetric font pairing system that efficiently pairs digital fonts. For example, in one or more embodiments, the asymmetric font pairing system automatically identifies and provides users with visually aesthetic font pairs for use in different sections of an electronic document. In particular, the asymmetric font pairing system learns visually aesthetic font pairs using joint symmetric and asymmetric compatibility metric learning. In addition, the asymmetric font pairing system provides compact compatibility spaces (e.g., a symmetric compatibility space and an asymmetric compatibility space) to computing devices (e.g., client devices and server devices), which enable the computing devices to quickly and efficiently provide font pairs to users.

20 Claims, 18 Drawing Sheets

(56) References Cited

OTHER PUBLICATIONS

Chichik et al., "An Online Algorithm for Large Scale Image Similarity Learning" in Advances in Neural Information Processing Systems 22 (NIPS 2009) (Year: 2009).*
Z. Wang, J. Yang, H. Jin, E. Shechtman, A. Agarwala, J. Brandt, and T. S. Huang. Deepfont: Identify your font from an image. In Proceedings of the 23rd ACM international conference on Multimedia, pp. 451-459. ACM, 2015. (Year: 2015).*
Combined Search & Examination Report as received in GB1812129.3 dated Jan. 17, 2019.
Examination Report as received in United Kingdom Application GB1812129.3 dated May 15, 2020.
Y.-Y. Ahn, S. E. Ahnert, J. P. Bagrow, and A.-L. Barabasi. Flavor network and the principles of food pairing. Scientific Reports, 1:196, Dec. 2011.
M. Bucher, S. Herbin, and F. Jurie. Improving semantic embedding consistency by metric learning for zero-shot classifification. In European Conference on Computer Vision, pp. 730-746. Springer, 2016.
Q. Cao, Y. Ying, and P. Li. Similarity metric learning for face recognition. In Proceedings of the IEEE International Conference on Computer Vision, pp. 2408-2415, 2013.
G. Chen, J. Yang, H. Jin, J. Brandt, E. Shechtman, A. Agarwala, and T. X. Han. Large-scale visual font recognition. In Proceedings of the IEEE Conference on Computer Vision and Pattern Recognition, pp. 3598-3605, 2014.
Z. Ding, S. Suh, J.-J. Han, C. Choi, and Y. Fu. Discriminative low-rank metric learning for face recognition. In Automatic Face and Gesture Recognition (FG), 2015 11th IEEE International Conference and Workshops on, vol. 1, pp. 1-6. IEEE, 2015.
L. Feng and B. Bhanu. Semantic concept co-occurrence patterns for image annotation and retrieval. IEEE transactions on pattern analysis and machine intelligence, 38(4):785-799, 2016.
C. Galleguillos, A. Rabinovich, and S. Belongie. Object categorization using co-occurrence, location and appearance. In IEEE Conference on Computer Vision and Pattern Recognition, pp. 1-8. IEEE, 2008.
V. Jagadeesh, R. Piramuthu, A. Bhardwaj, W. Di, and N. Sundaresan. Large scale visual recommendations from street fashion images. In Proceedings of the 20th ACM SIGKDD international conference on Knowledge discovery and data mining, pp. 1925-1934. ACM, 2014.
S. Jiang, X. Qian, J. Shen, Y. Fu, and T. Mei. Author topic model-based collaborative filtering for personalized poi recommendations. IEEE Transactions on Multimedia, 17(6):907-918, 2015.
A. Kembhavi, M. Salvato, E. Kolve, M. Seo, H. Hajishirzi, and A. Farhadi. A diagram is worth a dozen images. In ECCV, pp. 235-251. Springer, 2016.
R. Kumar, A. Satyanarayan, C. Torres, M. Lim, S. Ahmad, S. R. Klemmer, and J. O. Talton. Webzeitgeist: Design mining the web. In Proc. CHI, 2013.
L. Ladicky, C. Russell, P. Kohli, and P. H. Torr. Graph cut based inference with co-occurrence statistics. In European Conference on Computer Vision, pp. 239-253. Springer, 2010.
Z. Li, S. Chang, F. Liang, T. S. Huang, L. Cao, and J. R. Smith. Learning locally-adaptive decision functions for person verification. In Proceedings of the IEEE Conference on Computer Vision and Pattern Recognition, pp. 3610-3617, 2013.
S. Liu, J. Feng, Z. Song, T. Zhang, H. Lu, C. Xu, and S. Yan. Hi, magic closet, tell me what to wear! In Proceedings of the 20th ACM international conference on Multimedia, pp. 619-628. ACM, 2012.
T. Liu, A. Hertzmann, W. Li, and T. Funkhouser. Style compatibility for 3d furniture models. ACM TOG, 2015.
J. Lu, G. Wang, W. Deng, P. Moulin, and J. Zhou. Multimanifold deep metric learning for image set classification. In Proceedings of the IEEE Conference on Computer Vision and Pattern Recognition, pp. 1137-1145, 2015.
J. McAuley, R. Pandey, and J. Leskovec. Inferring networks of substitutable and complementary products. In Proceedings of the 21th ACM SIGKDD International Conference on Knowledge Discovery and Data Mining, pp. 785-794. ACM, 2015.
J. McAuley, C. Targett, Q. Shi, and A. van den Hengel. Image-based recommendations on styles and substitutes. In Proceedings of the 38th International ACM SIGIR Conference on Research and Development in Information Retrieval, pp. 43-52. ACM, 2015.
P. O'Donovan, J. Libeks, A. Agarwala, and A. Hertzmann. Exploratory font selection using crowdsourced attributes. ACM Transactions on Graphics (TOG), 33(4):92, 2014.
N. Siegel, Z. Horvitz, R. Levin, S. Divvala, and A. Farhadi. Figureseer: Parsing result-figures in research papers. In ECCV, pp. 664-680. Springer, 2016.
A. Veit, B. Kovacs, S. Bell, J. McAuley, K. Bala, and S. Belongie. Learning visual clothing style with heterogeneous dyadic co-occurrences. In Proceedings of the IEEE International Conference on Computer Vision, pp. 4642-4650, 2015.
Z. Wang, J. Yang, H. Jin, J. Brandt, E. Shechtman, A. Agarwala, Z. Wang, Y. Song, J. Hsieh, S. Kong, et al. Deepfont: A system for font recognition and similarity. In Proceedings of the 23rd ACM international conference on Multimedia, pp. 813-814. ACM, 2015.
Z. Wang, J. Yang, H. Jin, E. Shechtman, A. Agarwala, J. Brandt, and T. S. Huang. Deepfont: Identify your font from an image. In Proceedings of the 23rd ACM international conference on Multimedia, pp. 451-459. ACM, 2015.
Z. Wang, J. Yang, H. Jin, E. Shechtman, A. Agarwala, J. Brandt, and T. S. Huang. Real-world font recognition using deep network and domain adaptation. 2015.
K. Q. Weinberger and L. K. Saul. Distance metric learning for large margin nearest neighbor classification. Journal of Machine Learning Research, 10(Feb.):207-244, 2009.
E. P. Xing, A. Y. Ng, M. I. Jordan, and S. Russell. Distance metric learning with application to clustering with side-information. In NIPS, vol. 15, p. 12, 2002.
L.-F. Yu, S.-K. Yeung, D. Terzopoulos, and T. F. Chan. Dressup! outfit synthesis through automatic optimization. ACM TOG, 2012.
Examination Report as received in UK Application GB1812129.3 dated Nov. 10, 2020.

\* cited by examiner

710
Receiving User Input Selecting An Input Font From A Set Of Fonts 712
  UD Baseball
Home of the Blue Hens
Determine Output Fonts That Pair With The Input Fonts 714
$$f_{(M,G)}(x_i, y_j) = x^T G y - (x-y)^T M (x-y)$$
Presenting Font Pairs To The User 716
| UD Baseball | UD Baseball | UD Baseball |
| Home Of The Blue Hens | Home Of The Blue Hens | Home Of The Blue Hens |
| Arial Unicode MS | Tempus Sans ITC | Impact |
*Fig. 7B*

AUTOMATICALLY PAIRING FONTS USING ASYMMETRIC METRIC LEARNING

BACKGROUND

Recent years have seen a rapid proliferation in the use of computing devices in creating and editing electronic documents. Indeed, it is now common place for individuals, including businesses, to create digital marketing materials, digital magazines, web pages, e-mails, and other electronic documents utilizing computing devices. In addition, computing devices can assist individuals to generate electronic documents using text, images, and other audiovisual content to convey a chosen message to an indented audience through an electronic document.

Despite the ease at which computing devices help individuals to create electronic documents, there remains challenges with conventional digital publishing systems enabling individuals to craft visually aesthetic electronic documents. Visual aesthetics in an electronic document help to accurately communicate the message of the electronic document to an intended audience. Indeed, a key aspect of aesthetics in an electronic document is the fonts used in the document and how well the fonts used in different parts of the electronic document (e.g., header and body) pair with each other. However, conventional digital publishing systems fail to provide individuals with visually aesthetic font pairs between different sections of an electronic document.

Conventional digital publishing systems struggle to provide visually aesthetic font pairs for many reasons. For example, visually aesthetic font pairs are often different styles. Subtle distinctions between header fonts and body fonts (or between header and sub-header) can be very important. Thus, a conventional digital publishing system that only provides an individual with font pairs that include similar fonts will often fail to achieve the desired visually aesthetic result in an electronic document.

As another example, professional designers have established lists of rules for font pairing; however, these lists are difficult to formalize and can vary from designer to designer. In addition, as mentioned above, font pairing is not simply a problem of similarity matching, professional designers often pair contrasting fonts as well as similar fonts. As a result, not only is font pairing difficult for novice designers, such as everyday individuals who create electronic documents, but it is also a challenge for conventional digital publishing systems.

As a further example, font pairing is an asymmetric problem where two fonts making up a visually aesthetic font pair are not interchangeable. For instance, pairing Font A as a header font with Font B as the body font cam produce a much different visual aesthetic than pairing Font B as the header font and Font A as the body font. Again, simply providing a set of similar fonts to a selected font is insufficient to provide an individual with a font pair that delivers a visually aesthetic electronic document.

Because of the challenges to font pairing, many conventional digital publishing systems do not offer font pair recommendations. Some conventional digital publishing systems offer a limited number of pre-set template font pairs. As a result, an individual wanting a non-standardized font pair often must manually select font pairs they desire to use in an electronic document, based on their personal preferences. Individuals that are not professional designers often struggle to select visually aesthetic font pairs. Furthermore, due to the increasing number of available fonts, font pairing is a time-consuming and difficult task for even professional designers, which results in professional designers defaulting to the same font pairs across a variety of electronic documents.

More recent developments include employing neural networks to perform general font recommendations. While neural network based font recommendations provide various advantages, such system typically require large amounts of memory and computational requirements. As a result, client devices, and particularly mobile ones, typically do not have the ability to execute these neural networks.

These and other problems exist with regard to providing digital font pairs using conventional systems and methods.

SUMMARY

Embodiments of the present disclosure provide benefits and/or solve one or more of the foregoing or other problems in the art with systems, computer media, and methods for effectively pairing digital fonts (or simply "fonts") while accounting for the asymmetric nature of font pairings. For example, the disclosed systems employ asymmetric similarity metric learning to efficiently match an input font with fonts that pair with the input font in a harmonious and coherent manner. More particularly, the disclosed systems, given an input font can provide visually aesthetic font pairs across different sections of an electronic document, such as font pairs that offer various header fonts that pair well with an input body font.

To train an asymmetric font pairing system, one or more embodiments involve generating feature vectors for fonts in a training font set. In one or more embodiments, the disclosed systems, computer media, and methods employ a neural network, such as a convolutional neural network to determine the feature vectors for the fonts in the training font set. Using the feature vectors, the disclosed systems, computer media, and methods jointly learn a symmetric compatibility space and an asymmetric compatibility space for the fonts. In some embodiments, the symmetric compatibility space defines a first space in which distances between feature vectors indicate a symmetric compatibility between corresponding digital fonts of a digital font set. Similarly, in these embodiments, the asymmetric compatibility space defines a second space in which distances between feature vectors indicate an asymmetric compatibility between corresponding digital fonts of the digital font set. In addition, the disclosed systems, computer media, and methods generate a scoring function using the symmetric compatibility space and the asymmetric compatibility space that determines one or more fonts that pair with an input font.

In addition, the disclosed systems, computer media, and methods, can provide the symmetric compatibility space and the asymmetric compatibility space to a computing device that enables the computing device to determine matching candidate fonts that pair well with the input font. To do so, the disclosed systems, computer media, and methods can receive an input font. In response, the disclosed systems, computer media, and methods determine font pairing scores between the input font and fonts in a set of fonts. In particular, the disclosed systems, computer media, and methods determine font pairing scores based on the scoring function that includes the jointly learned symmetric compatibility space and the asymmetric compatibility space. Using the font pairing scores between the input font and fonts in the font set, the disclosed systems, computer media, and methods can present font pairs to the user. In this manner, the disclosed systems, computer media, and methods can provide a compact font pairing model to computing devices, which enables the computing devices to quickly and efficiently identify matching font pairs. Indeed, the disclosed systems, computer media, and methods enable computing devices to quickly and efficiently identify matching font pairs, based on existing fonts stored on the computing devices, while requiring significantly less memory and computational requirements than conventional systems.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description describes one or more embodiments with additional specificity and detail through the use of the accompanying drawings, as briefly described below.

FIG. 7B illustrates acts in performing a step for determining one or more output fonts that pairs with the input font based on the symmetric projection matrix and the asymmetric projection matrix in accordance with one or more embodiments.

DETAILED DESCRIPTION

Figure 1:
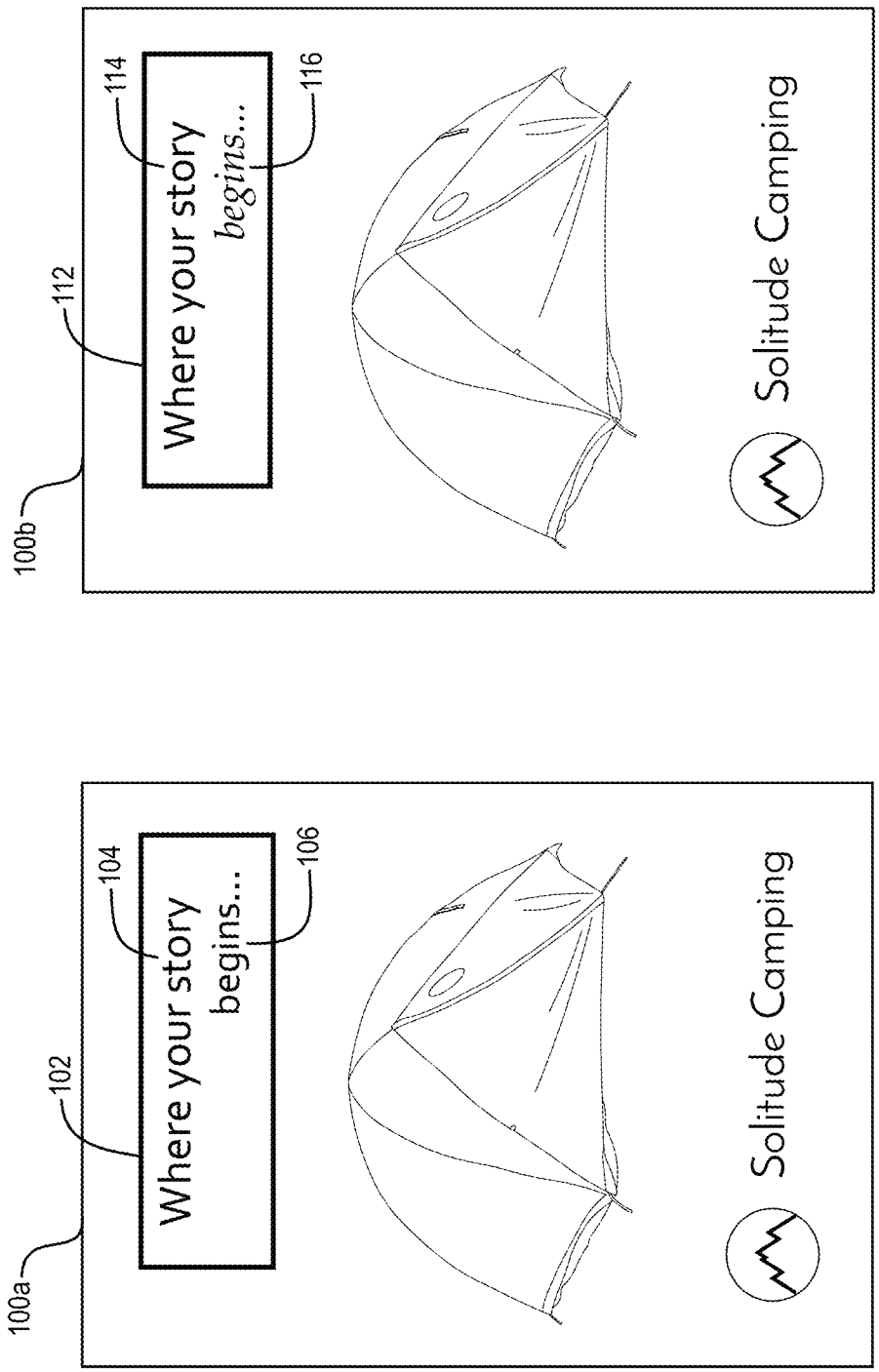
FIGS. 1A and 1B illustrate examples of font pairs in an electronic document in accordance with one or more embodiments.

This disclosure describes one or more embodiments of an asymmetric font pairing system that efficiently pairs digital fonts (or simply "fonts"). For example, in one or more embodiments, the asymmetric font pairing system automatically identifies and provides users with visually aesthetic font pairs between different sections of an electronic document. In particular, the asymmetric font pairing system determines visually aesthetic font pairs using joint symmetric and the asymmetric metric learning. In addition, the asymmetric font pairing system provides a compact model, which enable computing devices to quickly and efficiently provide font pairs to users.

In order to train the model, the asymmetric font pairing system can access a large database of documents that include high-quality font pairs, which the asymmetric font pairing system uses to generate a training font set and obtain font pairs. The asymmetric font pairing system then generates feature vectors for fonts in the training font set. In various embodiments, the asymmetric font pairing employs a neural network, such as a convolutional neural network (CNN) to determine the feature vectors for the fonts in the training font sets.

Using the feature vectors, the asymmetric font pairing system jointly learns a symmetric compatibility space and an asymmetric compatibility space. In one or more embodiments, the symmetric compatibility space defines a first space in which distances between feature vectors indicate a symmetric compatibility between corresponding fonts of a font set. Similarly, the asymmetric compatibility space defines a second space in which distances between feature vectors indicate an asymmetric compatibility between corresponding fonts of the font set.

The asymmetric font pairing system employs pairing and non-pairing indicator functions to generate the symmetric compatibility space and the asymmetric compatibility space. For example, the pairing indicator function indicates fonts that are paired in the training font set. The non-pairing indicator function can indicate when two fonts are not paired in the training font set. In some cases, the asymmetric font pairing system generates non-matching font pairs to use with the non-pairing indicator, which adds robustness to the learning process.

In addition, the asymmetric font pairing system can provide the scoring function, including the symmetric compatibility space and the asymmetric compatibility space, to a computing device, such as a client device. The client device employs the scoring function to determine font pairs. For example, upon a user providing an input font having a first document section type, the client device uses the scoring function to rank candidate fonts for a different document section type that pair with input font.

In some embodiments, the asymmetric font pairing system provides a graphical user interface to the client device that enables a user to interact with font pairs. For example, the graphical user interface allows a user to select an input font and is presented with various candidate font pairs. In addition, the graphical user interface enables the user to specify the section of an electronic document to which the input font belongs as well as which additional section in the electronic document for which to determine a font pair. For instance, the user provides an input font from the header section and requests candidate font pairs from the body section or a sub-header section.

As previously mentioned, the asymmetric font pairing system provides many advantages and benefits over conventional systems and methods. For example, the asymmetric font pairing system overcomes the fine-grained problem by identifying and valuing subtle distinctions between fonts in a font pair. In contrast, conventional systems avoid distinctions between fonts when pairing fonts and, as a result, identify similar fonts to an input font. However, visually aesthetic font pairs are largely made up of fonts having different characteristics and attributes.

As another example, the asymmetric font pairing system automates the complex process of identifying and selecting aesthetic font pairs for different sections of an electronic document. As mentioned above, professional designers have established lists of rules for font pairing that are difficult to formalize and can vary from designer to designer. Further, because many users have little or no training with font pairing, users often select contrasting font pairs that detract from the message of the electronic document.

Moreover, the process of selecting font pairs is further complicated by the increasing number of available fonts. Many client devices include hundreds of fonts and users can easily add additional fonts. Indeed, with each additional font, the number of font pairs (both aesthetic and non-aesthetic pairs) increases. As a result, users default to the same font pair irrespective of the type of electronic documents being generated, which often detracts from the message of the electronic document. The asymmetric font pairing system overcomes this problem by identifying which fonts on a user's client device (or another location) visually pair with a given font, and providing the visually aesthetic fonts pairs to the user in an intuitive interface. Further, as additional fonts are added to a client device, the sizes of the compatibility spaces do not change, unlike conventional systems which scale exponentially based on the number of fonts.

As another benefit, the asymmetric font pairing system solves the non-interchangeable font pairing problem. As mentioned above, pairing Font A as a header font with Font B as the body font of an electronic document does not create the same visual aesthetic as pairing Font B as the header font and Font A as the body font. Indeed, the font pairs for Font A as a header font will also vary from the font pairs for Font A as a sub-header or body font. Accordingly, the asymmetric font pairing system jointly learns symmetric and the asymmetric compatibility spaces that position fonts that pair well near each other in multidimensional space and likewise separate font pairs that are mismatched in the same space.

As a further benefit, the asymmetric font pairing system significantly improves memory and computational requirements over conventional systems. For instance, many conventional systems require a database that maintains the font pairings between every potential font pair. The size of this database exponentially increases as fonts are added. Accordingly, the database is too large to be stored on many client devices. In contrast, the asymmetric font pairing system produces two compact compatibility spaces (e.g., compatibility space projection matrices) that are small in size and easily transferable to any client device (e.g., often less than 1 megabyte of total space). The compatibility spaces work with any font collection stored on a client device. Further, as mentioned above, the sizes of the compatibility spaces do not change as fonts are added to a client device.

Furthermore, because of the compact size of the two compatibility spaces provided by the asymmetric font pairing system, client devices can use existing fonts stored to identify font pairs in real-time or near-real-time. Indeed, upon selecting an input font for a section of an electronic document, the client device can use a scoring function in connection with the two compatibility spaces to quickly identify and show a ranked list of fonts used in another section of the electronic document that pair with the input font. In this manner, the asymmetric font pairing system enables computing devices to quickly and efficiently identify matching font pairs while using significantly less memory and computational requirements than conventional systems.

Referring now to the figures, FIGS. 1A and 1B illustrate contrasting examples of font pairing in an electronic document 100a, 100b. As mentioned above, pairing fonts in an electronic document is an important task in graphic design. If a user selects a font pair that does not complement each of the fonts in the pair, the font pair can "clash" or appear disconnected and interfere with the message trying to be conveyed in the electronic document. To briefly illustrate, FIG. 1A shows a first font pair 102 that includes the same font used for the header and the sub-header. FIG. 1B shows a second font pair 112 with differing but compatible fonts for the header and the sub-header. As shown, the second font pair 112 conveys a different, more compelling, message than the first font pair 102 by employing a font pair that is more visually aesthetic.

In more detail, FIG. 1A shows an electronic document 100a having the first font pair 102 with a header font 104 and a sub-header font 106 that both use the same font (i.e., Corbel). While the header font 104 is larger than the sub-header font 106, the first font pair 102 employs the same font class and characteristics. In particular, both the header font 104 and the sub-header font 106 in the first font pair 102 have "Regular" or default attributes for the selected font.

In contrast, FIG. 1B shows the electronic document 100b having the second font pair 112 with a header font 114 and a sub-header font 116 that are different fonts, from different font classes, and having different font characteristics. As shown, the header font 114 is Corbel, and the sub-header font 116 is Book Antigua. The header font 114 and the sub-header font 116 belong to different font classes and have different font characteristics. For example, the header font 114 is a san serif font (e.g., no tails on the letters) having even stroke weights while the sub-header font 116 is a serif font having strokes with varying weights. Additionally, the header font 114 has the default regular font characteristics while the sub-header font 116 employs italic font characteristics.

As illustrated, the compatible, although contrasting, font classes and font attributes in the second font pair 112 create a more pleasing aesthetic than the similar first font pair 102. However, more than merely selecting two contrasting fonts for different sections of an electronic document is needed to create a visually aesthetic font pair. Further, in some cases, a similar font pair like the first font pair 102 may be more visually aesthetic to convey the message of an electronic document than a contrasting font pair. Accordingly, as described below in connection with the remaining figures, the asymmetric font pairing system automatically identifies and provides users with font pairs that are proven to be visually aesthetic.

The following terms are provided for reference. As used herein, the term "electronic document" refers to an electronic file that includes a digital font. For example, an electronic document can include electronic files in the form of a word-processing document, a portable document file (PDF), an image file, an e-mail file, a text file, a web page, or any other electronic file. An electronic document can comprise an electronic advertisement, brochure, flyer, or other digital marketing material. Similarly, an electronic document can comprise an electronic book, magazine, periodical, or other digital publication. Thus, as shown in FIG. 1B, the electronic documents 100a, 100b comprise a digital advertisement.

In addition, an electronic document can include multiple document sections (e.g., document section types). As used herein, the terms "document sections" refer to a structured portion of an electronic document. Example document sections of an electronic document include, but are not limited to, title, header, sub-header, body, table, caption, headnote, footnote, signature, and appendix. A document section can include digital characters with different fonts and/or digital characters having fonts with different characteristics.

As used herein, the term "digital font" (or simply "font") refers to a defined set of digital characters. In particular, the term "font" includes a collection of digital characters of a particular style or typeface. A font includes digital files with the extensions, such as, but not limited to: .ttf, .otf, .fnt, .abf, .ttc, .suit, .woff, .vnf, .t65, .sfp, .sad, .pmt, .pfm, .pfb, .pfa, .odtff, .mf, .gdr, .fon, .fnt, .etx, .eot, .compositefont, .acfm, .afm, or .amfm. For example, the term digital font includes fonts entitled Times New Roman, Helvetica, Arial, Adobe Clean Light, PT Sans Regular, Corbel, or other font titles included herein.

A font can include a font classification (i.e., font class), and font characteristics. As used herein, the term "font classification" refers to a font category and can include pre-defined categories utilized to classify digital fonts. For instance, font classifications include font classes (i.e., Serif, Sans Serif, Slab Serif, Script, Blackletter, Mono, Hand, or Decorative). In addition, the term "font characteristic," as used herein, refers to attributes corresponding to a font. In particular, the term "font characteristic" describes the style applied to a font. For example, font characteristics can include style (e.g., regular, bold, italic, shadowed, underlined, strikethrough, subscript, or superscript), weights (e.g., light, regular, and heavy weights), widths (e.g., condensed, regular, and extended widths), capitalization styles (e.g., all caps, small caps, title case, and sentence case), x-heights (e.g., small, regular and large x-heights), font glyph data, such as glyph curvature, spacing, size, shape, width, height, location (e.g., location in relation to the baseline), area, orientation, number of curves per glyph, arc length, or contrasts (e.g., low, regular, and high contrasts).

In addition, the asymmetric font pairing system can reduce a font to one or more numeric metrics, such as into a feature vector. As used herein, the term "font feature vector" (or simply ("feature vector") refers to features of a font. The features can be latent features or measurable features. In particular, the term "feature vector" includes a set of numeric metrics corresponding to attributes and characteristics of a font. In one or more embodiments, a feature vector is a multi-dimensional dataset that represents a font.

In one or more embodiments, a feature vector includes a set of numeric metrics learned by a machine-learning algorithm. In such cases, the feature vector can include font classification features (e.g., font features utilized to classify a font), font symmetric features (e.g., font features utilized to identify similar fonts), and/or font asymmetric features (e.g., font features utilized to identify differing fonts). Thus, a feature vector can include latent representations determined by a machine-learning algorithm such as a neural network. Alternatively, a feature vector can include non-latent-features, such as low-level numerical metrics that represent the style, height, weight, width, and other characteristics of a font.

The term "machine learning," as used herein, refers to the process of constructing and implementing algorithms that can learn from and make predictions on data. In general, machine learning may operate by building models from example inputs (e.g., training), such as a training font set, to make data-driven predictions or decisions. In some example embodiments, machine learning is used for data mining, and statistical pattern recognition, such as collaborative feature learning, or learning features from a training font set. In addition, the term "machine learning algorithm" includes neural networks, such as convolutional neural networks (CNN).

The term "latent representations" may refer to representations or features that are not directly measurable. In particular, "latent representations" can comprise representations or factors that are inferred through modeling by using other features. Similarly, the terms "latent representations" may refer to representations that are generated by modeling indirect data through feature learning. Feature learning can comprise two categories: supervised feature learning and unsupervised feature learning. In supervised feature learning, features are learned based on labeled input data. Examples include neural networks, multilayer perceptron, and (supervised) dictionary learning. In unsupervised feature learning, features are learned with unlabeled input data. Examples include dictionary learning, independent component analysis, matrix factorization, and various forms of clustering.

As used herein, the term "joint learning" refers to a machine-learning algorithm where multiple learning models are solved together. In particular, the term "joint learning" includes solving a plurality of learning tasks at the same time while utilizing the roles and constraints across the tasks. For example, the asymmetric font pairing system can employ indicator functions as part of joint learning. As used herein, the term "indicator function" refers to a function that indicates membership of fonts in a particular subset. For instance, an indicator function can be a pairing, matching, or positive indicator function that indicates that a given font pairs with another given font in a training font set. In another instance, an indicator function can be a non-pairing, non-matching, or negative indicator function that indicates that a given font does not pair with another given font in the learning font set. In one or more embodiments, an indictor function is an indication that two fonts are paired in a training font set in a given document section combination.

In addition, the asymmetric font pairing system employs joint learning to solve for a symmetric space and an asymmetric space based on font feature vectors. As used herein, "symmetric space" or "symmetric compatibility space" refers to multi-dimensional space that identifies a symmetric compatibility between pairs of fonts in a font set based on feature vectors of the fonts. The term "symmetric compatibility space" refers to a space (in which the distance between a font (e.g., an input font) and other fonts indicates a symmetric compatibility. In one or more embodiments, the symmetric compatibility space is a latent space. For example, when the feature vectors include latent features, the symmetric compatibility space can comprise a latent space. Being symmetric, the symmetric compatibility space indicates fonts that are compatible in at least one context (i.e., at least one document use case such as header/sub-header) without regard to whether the same pair of fonts would be compatible if the document use case was switched. As used herein a symmetric projection matrix is a numerical representation of a symmetric compatibility space.

Similarly, as used herein, the term "asymmetric space" or "asymmetric compatibility space" refers to multi-dimensional space that identifies an asymmetric compatibility between pairs of fonts in a training font set based on features of the fonts. For instance, the term "asymmetric compatibility" refers to a space in which the distance between a font (e.g., an input font) and other fonts indicates an asymmetric compatibility given a document use case. In one or more embodiments, the asymmetric compatibility space is a latent space. For example, when the feature vectors include latent features, the asymmetric compatibility space can comprise a latent space. Being asymmetric, the distance between feature vectors in the asymmetric compatibility space is dependent upon the document section assigned to the input font. Indeed, the asymmetric compatibility (as indicated by a distance in the asymmetric compatibility space) between Font A as a header and Font B as a sub-header can have a different asymmetric compatibility (as indicated by a distance in the same asymmetric) than Font B as a header and Font A as a sub-header. As used herein an asymmetric projection matrix is a numerical representation of an asymmetric compatibility space.

As used herein, the terms "joint scoring function," "adaptive scoring function" or simply "scoring function" refer to a function that applies the joint learning models to arrive at a result having a numeric value. For instance, a scoring function provides an accurate probabilistic prediction given the joint learning models as input. For example, the asymmetric font pairing system employs a scoring function to score and rank font pairs between an input font and candidate fonts that pair with an input font. As used herein, the term "input font" refers to a font for which candidate fonts are identified based on the scoring function. The term "candidate font" refers to fonts from a set of fonts (e.g., fonts located on a computing device) that potentially pair with the input font.

Figure 2:
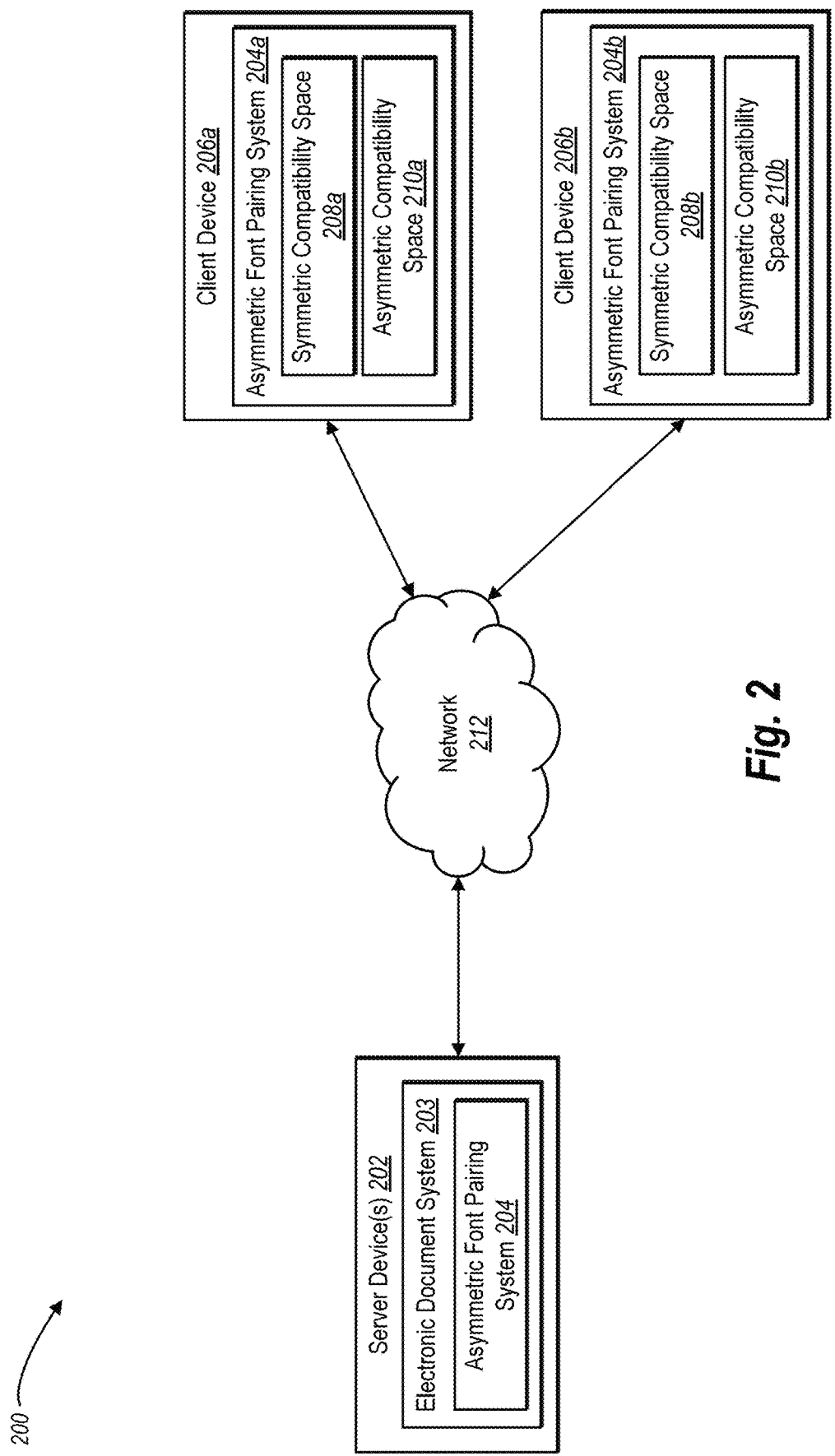
FIG. 2 illustrates a schematic diagram of an exemplary environment in which an asymmetric font pairing system may be implemented in accordance with one or more embodiments.

FIG. 2 illustrates a schematic diagram of an environment 200 in which an asymmetric font pairing system 204 may be implemented in accordance with one or more embodiments. In one or more embodiments, the environment 200 includes various computing devices including a server device(s) 202 and one or more client devices 206a, 206b. In addition, the environment 200 includes a network 212. The network 212 may be any suitable network over which the computing devices can communicate. Example networks are discussed in more detail below.

As illustrated in FIG. 2, the environment 200 includes the server device(s) 202. The server device(s) 202 may comprise any computing device, such as one or more of the computing devices described below. In addition, the server device(s) 202 implement an electronic document system 203 that includes the asymmetric font pairing system 204. The electronic document system 203 can comprise a cloud or server based system that provides for the use of fonts with electronic documents, such as for example, ADOBE® ACROBAT®, ADOBE® INDESIGN®, ADOBE® PHOTOSHOP®. Alternatively, the electronic document system 203 can comprise a font management system, such as ADOBE® TYPEKIT®. The asymmetric font pairing system 204 can work in connection with the electronic document system to suggest fonts for use in an electronic document.

The server device(s) 202 may transmit data to the one or more client devices 206a, 206b. For example, the asymmetric font pairing system 204 transmits the symmetric compatibility space and the asymmetric compatibility space to the client device 206a. The client devices 206a, 206b may comprise any computing device, such as one or more of the computing devices described below in relation to FIG. 13. As shown, the one or more client devices 206a, 206b include one or more components of the asymmetric font pairing system 204a, 204b. For example, the asymmetric font pairing system 204a, 204b include a symmetric compatibility space 208a, 208b and the asymmetric compatibility space 210a, 210b. For example, the one or more client devices 206a, 206b receive the symmetric compatibility space 208a, 208b and the asymmetric compatibility space 210a, 210b from the asymmetric font pairing system 204 on the server device(s) 202. As described below, the one or more client devices 206a, 206b can employ the symmetric compatibility space 208a, 208b and the asymmetric compatibility space 210a, 210b to provide a corresponding user with font pairs that match candidate fonts to an input font.

As illustrated, in one or more embodiments, the server device(s) 202 can include all, or a portion of, the asymmetric font pairing system 204. In particular, the asymmetric font pairing system 204 can comprise an application running on the server device(s) 202 or a portion of a software application that can be downloaded from the server device(s) 202. For example, the asymmetric font pairing system 204 can include a web hosting application that allows a client device 206a to interact with content hosted on the server device(s) 202. To illustrate, in one or more embodiments of the environment 200, the client device 206a accesses a web page supported by the server device(s) 202. In particular, the client device 206a can run an application to allow a user to access, view, select, and/or interact font pairs within a web page or website hosted at the server device(s) 202 (e.g., a web page enables a user to select an input font and section of an electronic document).

Although FIG. 2 illustrates a particular arrangement of the server device(s) 202, the client devices 206a, 206b and the network 212, various additional arrangements are possible. For example, while FIG. 2 illustrates the one or more client devices 206a, 206b communicating with the server device(s) 202 via the network 212, in one or more embodiments a single client device may communicate directly with the server device(s) 202, bypassing the network 212.

Similarly, although the environment 200 of FIG. 2 is depicted as having various components, the environment 200 may have additional or alternative components. For example, the asymmetric font pairing system 204 can be implemented on multiple computing devices. In particular, the asymmetric font pairing system 204 may be implemented in whole by the server device(s) 202 or the asymmetric font pairing system 204 may be implemented in whole by the client device 206a. Alternatively, the asymmetric font pairing system 204 may be implemented across multiple devices or components (e.g., utilizing the server device(s) 202 and the one or more client devices 206a, 206b).

Figure 3:
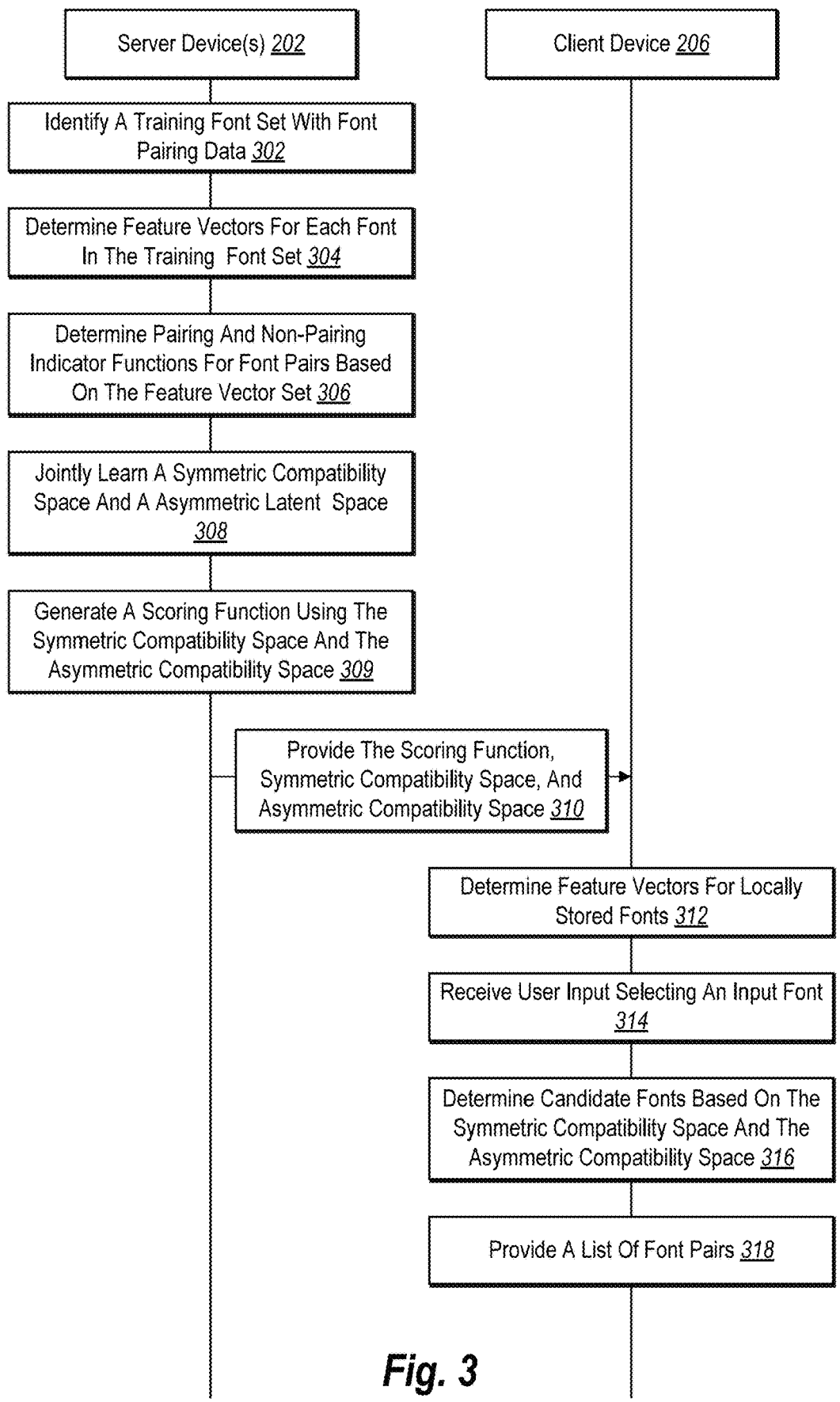
FIG. 3 illustrates a sequence diagram of training and employing an asymmetric font pairing system in accordance with one or more embodiments.

FIG. 3 provides a broad overview of training and employing the asymmetric font pairing system in accordance with one or more embodiments. More details regarding the training and employing of the asymmetric font pairing system are provided below in reference to FIGS. 7A-9. As shown, FIG. 3 includes the server device(s) 202 that host the asymmetric font pairing system 204 and a client device 206 (which may represent a client device of the one or more client devices 206a, 206b) implementing one or more components of the asymmetric font pairing system 204a. While certain acts are shown on either the server device(s) 202 or the client device 206 in the illustrated embodiment, these acts can be performed by different or multiple computing devices in alternative embodiments. Furthermore, while the acts are described as being performed by the asymmetric font pairing system 204, one will appreciate that this is short hand for computer-readable instructions (e.g., part of the asymmetric font pairing system) that when executed, cause the server device(s) 202 and/or the client device 206 to perform a given action as indicated by FIG. 3.

For simplicity of explanation, the acts described in FIG. 3 are described with respect to header fonts, body fonts, and header/body font pairings. While header fonts, body fonts, and header/body font pairings are described, the act described in FIG. 3 equally apply to other sections of an electronic document (i.e., fonts correspond to different document section types). For example, the acts could be described as the first font from a first section of an electronic document and the second font from a second section of the electronic document. For instance, the acts described in FIG. 3 correspond to header fonts, sub-header fonts, and header/sub-header font pairings.

As shown in FIG. 3, the asymmetric font pairing system 204 identifies 302 a training font set with font pairing data. For example, the asymmetric font pairing system 204 obtains, accesses, generates, and/or collects a training font set that includes at least header fonts, body fonts, and indications of font pairs between the header fonts and the body fonts (e.g., header/body font pairs). The indications of font pairs can comprise a list or can be extracted from documents. For example, the asymmetric font pairing system 204 can identify which font pairings used in documents to determine indications of font pairs. The header/body font pairs indicate which fonts having a header document section type in the training font set pair with which fonts having a body document section type in the training font set.

In one or more embodiments, the asymmetric font pairing system 204 identifies a font pairing list. For example, the training font set includes, for each header font, a list of body fonts that pair with the header font. In addition, the list can include repeated heading/body font pairs to capture which font pairs are more common in the training font set. In alternative embodiments, the asymmetric font pairing system 204 generates the training font set by constructing a list of font pairs for each header font that includes each body font that pairs with the header font.

Further, the asymmetric font pairing system 204 can identify and/or generate a list of font pairs for each body font that includes corresponding header fonts. As mentioned above, font pairing is an asymmetric issue because, among other issues, header/body font pairs in a training font set are not equivalent to body/header font pairs from the same training font set. For simplicity, header/body font pairs are described; however, the same principles, techniques, and actions apply to body/header font pairs or font pairs between other sections of an electronic document.

In some embodiments, the number of header fonts differs from the number of body fonts in the training font set. For example, the training font set includes fewer header fonts than body fonts. In various embodiments, the training font set provides images of the header font and the body font such that the asymmetric font pairing system can learn font features of each font, as described below. In additional embodiments, the training font set includes metadata for one or more fonts in the training font set, such as font characteristics. A detailed example of a training set of fonts is provided with respect to FIG. 9 below.

The asymmetric font pairing system 204 determines 304 feature vectors for each of the fonts in the training font set. For example, the asymmetric font pairing system 204 employs a machine-learning algorithm to learn latent features of fonts in the training font set. In one or more embodiments, the asymmetric font pairing system 204 computes feature vectors by employing a machine-learning algorithm model (e.g., a DeepFont model such as that described in U.S. Pat. No. 9,501,724, the entire contents of which are hereby incorporated by reference) that uses visual font recognition (VFR), a convolutional neural network (CNN) decomposition approach, and a domain adaption technique based on a stacked convolutional automatically-encoder (SCAE). For example, using the above machine-learning algorithm model, the asymmetric font pairing system 204 obtains a feature vector for font i as $x_i \in \mathcal{R}^D$, where D represents 768 dimensions. Alternatively, the server device(s) 202 can employ a machine-learning algorithm model that uses a different number of dimensions.

In alternative embodiments, the asymmetric font pairing system 204 analyzes each font and builds a feature vector based on measurable (i.e., non-latent) features such as font classes (i.e., Serif, Sans Serif, Slab Serif, Script, Blackletter, Mono, Hand, or Decorative), weights (e.g., light, regular, and heavy weights), widths (e.g., condensed, regular, and extended widths), x-heights (e.g., small, regular and large x-heights), contrasts (e.g., low, regular, and high contrasts), capitalization styles, figures styles, or other attributes.

The asymmetric font pairing system 204 determines 306 a pairing indicator function for font pairs. As mentioned above, the asymmetric font pairing system 204 identifies and/or generates a list of font pairs for each header font. For each header/body font pair in the training font set (e.g., positive font pair), the asymmetric font pairing system 204 sets a pairing indicator function to a first value (e.g., 1).

In addition, the asymmetric font pairing system 204 determines 306 a non-pairing indicator function for font pairs. Because the training font set may not indicate when a header font and a body font do not pair (e.g., negative font pairs), in one or more embodiments, the asymmetric font pairing system 204 generates non-pairing font pairs. For example, the asymmetric font pairing system 204 randomly generates samples of negative font pairs from possible font pairs, excluding the positive font pairs.

For each negative header/body font pair, the asymmetric font pairing system 204 sets a non-pairing indicator function to a second value (e.g., 0 or −1). In general, for robustness, the asymmetric font pairing system 204 roughly generates the same number of negative font pairs as positive font pairs. Accordingly, the number of pairing indicator functions set to the first value (e.g., 1) roughly equal the number of non-pairing indicator functions set to the second value (e.g., 0 or −1). One will appreciate that the asymmetric font pairing system can employ different values for the indicator functions.

One will appreciate in light of the disclosure herein that the indicator functions are document section combination specific. In other words, for a given pair of fonts X and Y, the indicator function can be positive when font X is used in a header section and font Y is used in a body section and negative when font X is used in a header section and font Y is used in a sub-header section.

Based on the indicator functions, the asymmetric font pairing system 204 jointly learns 308 a symmetric compatibility space and an asymmetric compatibility space. In one or more embodiments, the asymmetric font pairing system 204 employs metric learning (ML), which is a supervised machine-learning algorithm, to jointly learn the two compatibility spaces. Generally, conventional single metric learning enlarges the distance between the feature vectors of non-compatible fonts (e.g., non-pairing fonts) and narrows the distance between feature vectors of compatible fonts (e.g., pairing fonts). However, conventional single metric learning does not address the asymmetric issue of font pairings, which, as described above, is problematic.

To address this issue, the asymmetric font pairing system 204 applies a joint model that bridges the learning of a distance metric between and an asymmetric compatibility decision rule for pairing fonts as described in greater detail below with regard to FIG. 7A. For example, in one or more embodiments, the asymmetric font pairing system 204 jointly learns the symmetric compatibility space and the asymmetric compatibility space based on jointly learning symmetric and asymmetric relationships between font pairs. For instance, the asymmetric font pairing system 204 provides Font X and Font Y to a machine-learning algorithm along with an indication of whether Font X and Font Y form a symmetric pair as well as an indication of whether Font X and Font Y form an asymmetric pair (e.g., the pairing and non-pairing indicator functions described above).

Based on the input (i.e., Font X, Font Y, a symmetric indication, and an asymmetric indication), the asymmetric font pairing system 204 jointly learns the symmetric compatibility space and asymmetric compatibility space. For instance, the asymmetric font pairing system 204 employs metric learning to map feature vectors for Font X and Font Y close together in symmetric compatibility space when the two fonts are symmetric pairs and farther apart when the two fonts are non-symmetric pairs. Similarly, the asymmetric font pairing system 204 maps feature vectors for Font X and Font Y close together in asymmetric compatibility space when the two fonts are asymmetric pairs and farther apart with the two fonts are non-asymmetric pairs.

Further, the asymmetric font pairing system 204 can repeat the process for each font pair in the training font set. Overall, the asymmetric font pairing system 204 continues to learn the symmetric compatibility space and the asymmetric compatibility space until the objective function is minimized. Note, in some cases, minimizing the objective function loss may result either suboptimal symmetrical error loss or suboptimal asymmetrical error loss.

Thus, in some embodiments, the asymmetric font pairing system 204 utilizes an objective function as part of jointly learning the symmetric compatibility space and the asymmetric compatibility space. As part of utilizing the objective function, the asymmetric font pairing system 204 applies regularization to prevent feature vectors from too much distortion. For instance, regulation causes the symmetric compatibility space and the asymmetric compatibility space to better resemble an identity matrix in the compatibility space, which provides additional stability and robustness to the compatibility spaces. Further, in various embodiments, the asymmetric font pairing system 204 also employs a trade-off parameter and/or the Frobenius norm, as further described below in connection with FIG. 7A.

In one or more embodiments, the symmetric compatibility space and the asymmetric compatibility space have the same dimensionality to one another. Because the symmetric compatibility space and the asymmetric compatibility space have the same dimensions, the asymmetric font pairing system 204 can generate and use a scoring function that employs the two compatibility spaces to determine a numerical measure indicating how well two fonts pair. Further, based on the scores of the scoring function, the asymmetric font pairing system 204 can recommend candidate fonts that pair with an input font. Similarly, the asymmetric font pairing system 204 can provide the scoring function as well as the two compatibility spaces to a computing device to enable the computing device to identify and recommend candidate fonts based on an input font.

As mentioned above, the asymmetric font pairing system 204 can jointly learn a symmetric compatibility space and an asymmetric compatibility space for each document section combination. To illustrate, the same font pair that works well between the header and a sub-header of an electronic document does not pair well between the header and the body of an electronic document. Accordingly, the asymmetric font pairing system 204 identifies a symmetric compatibility space and an asymmetric compatibility space to determine font pairs between each type of document section pairing. Notably, however, the asymmetric font pairing system 204 can employ the same set of compatibility spaces (e.g., symmetric compatibility space and asymmetric compatibility space) to determine font pairs the same document section combination, regardless of which document section includes the input font (e.g., header/body font pair or body/header font combination).

To illustrate, FIG. 3 shows the asymmetric font pairing system 204 generating 309 a scoring function using the symmetric compatibility space and the asymmetric compatibility space. Generally, the scoring function produces a distance between an input font and a potential candidate font in the compatibility spaces. In one or more embodiments, the asymmetric font pairing system 204 generates an adaptive scoring function having an adaptive threshold that changes based on the current font input and the potential candidate fonts. Thus, unlike conventional systems that use a constant threshold, the asymmetric font pairing system 204 generates a scoring function that accounts for both the symmetric compatibility space and the asymmetric compatibility space when computing the font pairing scores for an input font. An example of an adaptive scoring function is provided below with respect to FIG. 7B.

In addition, the asymmetric font pairing system 204 provides 310 the scoring function along with the symmetric compatibility space and the asymmetric compatibility space to the client device 206. For instance, the asymmetric font pairing system 204 provides an adaptive scoring function that incorporates the symmetric projection matrix and an asymmetric projection matrix to the client device 206. In this manner, as described further below, the asymmetric font pairing system 204 can provide the client device 206 with a scoring function that identifies candidate fonts for an input font, where the candidate fonts have asymmetric characteristic matching, but also forms a visually aesthetic font pair with the input font.

In addition to providing the scoring function and the two compatibility spaces for header/body font pairs, in one or more embodiments, the asymmetric font pairing system 204 provides compatibility spaces corresponding to font pairs of different document sections (e.g., header/sub-header and sub-header/body font pairs). In these embodiments, the client device 206 can employ the same scoring function, but with the two compatibility spaces corresponding to the document section type of the selected input font and the document section type of the selected candidate fonts. In this manner, the asymmetric font pairing system 204 can enable the client device 206 to determine font pairs between multiple document section combinations by providing only the additional compact compatibility spaces for each combination.

As a note, while the asymmetric font pairing system 204 determines the symmetric compatibility space and the asymmetric compatibility space from the training font set, unlike conventional systems, the asymmetric font pairing system 204 need not provide the training font set to the client device 206. Often, the training font set is massive and too large to store on many client devices, such as mobile devices with limited memory. In contrast, the symmetric compatibility space and the asymmetric compatibility space are often less than 1 megabyte in size, which can easily be stored by most client devices. Further, because the compatibility spaces are small in size, the asymmetric font pairing system 204 can provide multiple sets of compatibility spaces to a client device to store, as mentioned previously.

As shown in FIG. 3, the client device 206 determines 312 feature vectors for locally stored fonts. For example, the asymmetric font pairing system 204 provides instructions to the client device 206 on how to determine and store feature vectors for locally stored fonts. A client device need only perform this action once for existing fonts and when an additional font is subsequently added to the client device 206. Because the number of fonts locally stored on the client device is generally less than a few hundred, the computational and memory resources to generate and store these feature vectors is trivial. In alternative embodiments, the asymmetric font pairing system 204 determines the feature vectors at the server device(s) and sends them to the client device 206 so as to be able to leverage the computing resources of the server device(s) 202.

In addition, the fonts stored on the client device 206 need not be fonts that are from the training font set. To explain, as mentioned above, the asymmetric font pairing system 204 employs a machine-learning algorithm that reduces fonts in the training font set to multidimensional numerical feature vectors, where the dimensions represent the latent characteristics and attributes of the font. Similarly, the asymmetric font pairing system 204 uses the same or similar machine-learning algorithm to reduce fonts on the client device 206 to the same multidimensional numerical feature vectors.

As illustrated, the client device 206 receives 314 user input selecting an input font in an electronic document. For instance, the user selects a header font stored on the client device 206 as an input font in an electronic document and request one or more candidate body fonts that pair well with the input header font. In additional embodiments, the client device 206 receives input of the user selecting or specifying the section to which the input font corresponds (e.g., the header section) and the section to which the one or more candidate fonts correspond (e.g., the body section). Examples of receiving user input for an input font, candidate fonts, and sections of an electronic document are described below in connection with FIGS. 5A-5D.

Based on receiving the input font, the client device 206 determines 316 font pairs from candidate fonts based on the symmetric compatibility space and the asymmetric compatibility space. In particular, the client device 206 employs the scoring function that computes a font pairing score (e.g., a header/body font pairing score) between the input header font and the fonts stored on the client device 206. Generally, the computational time is proportional to the number of fonts stored on the client device 206, and because the number of stored fonts is relatively small (e.g., a few hundred), the client device 206 can score each font in real-time or near-real time.

As mentioned above, the scoring function analyzes the input header font with respect to each stored font on the client device 206 in view of the symmetric compatibility space and the asymmetric compatibility space. For example, using the feature vector of the input header font, the asymmetric font pairing system 204 determines which stored fonts have feature vectors that are closest to the input header font in both the symmetric compatibility space and the asymmetric compatibility space. The scoring function enables the asymmetric font pairing system 204 to arrive at a numeric value (i.e., a font pairing score) that represents the distance between the two fonts.

Using the header/body font pairing scores, the asymmetric font pairing system 204 can determine one or more candidate body fonts to pair with the input header font. For example, in one or more embodiments, the client device 206 identifies a subset of the stored fonts as pairing body fonts. In some embodiments, the subset is based on a font pairing score threshold, such as the top ten font pairing scores, top 10% of the header/body font pairing scores, and/or fonts with a font pairing score over a threshold amount. For instance, the asymmetric font pairing system 204 selects the top five header/body font pairing scores as candidate body fonts.

As shown, the asymmetric font pairing system 204 provides 318 a list of font pairs. For instance, the client device 206 provides each of the identified high scoring body font paired with the input header font to the user. In some embodiments, the client device 206 provides the font pairs within the electronic document. In alternative embodiments, the client device 206 provides the font pairs in a separate graphical user interface from the electronic document.

Of note, the asymmetric font pairing system 204 can employ the same scoring function and compatibility spaces to determine header/body font pairs with either a header font or a body font is the input font. Indeed, unlike conventional systems, the asymmetric compatibility space causes the distance between Font A having a header document type and Font B having a body document type to be different than the distance between Font B having a header document type and Font A having a body document type. As a result, the asymmetric font pairing system 204 can properly determine asymmetrical font pairs using the same asymmetric compatibility space.

In various embodiments, the client device 206 determines that the number of pairing fonts is below a minimum number of available font pairs. For example, the client device 206 identifies less than three fonts that pair well with the input font. Further, in some embodiments, the client device 206 can prompt the user to view additional font pairings online via the asymmetric font pairing system 204.

In the preceding embodiments, the client device 206 can automatically, or based on user input, request additional font pairings from the asymmetric font pairing system 204. For example, the client device 206 provides a text string with the input header font to the asymmetric font pairing system 204 and the asymmetric font pairing system 204 identifies additional candidate body fonts using an online font repository. The asymmetric font pairing system 204 can display the additional font pairs to the user within the application that displays the electronic document or via a web interface. In addition, if the user selects a candidate font not located on the client device 206, the asymmetric font pairing system 204 can assist the user in buying and/or downloading and installing the selected font.

It will be appreciated that the acts described in relation to FIG. 3 are intended to be illustrative of acts in accordance with the present disclosure, and are not intended to limit potential embodiments. Alternative embodiments can include additional, fewer, or different acts than those articulated in FIG. 3. Additionally, the acts described herein may be performed in a different order, may be repeated or performed in parallel with one another, or may be performed in parallel with different instances of the same or similar acts.

Figure 4:
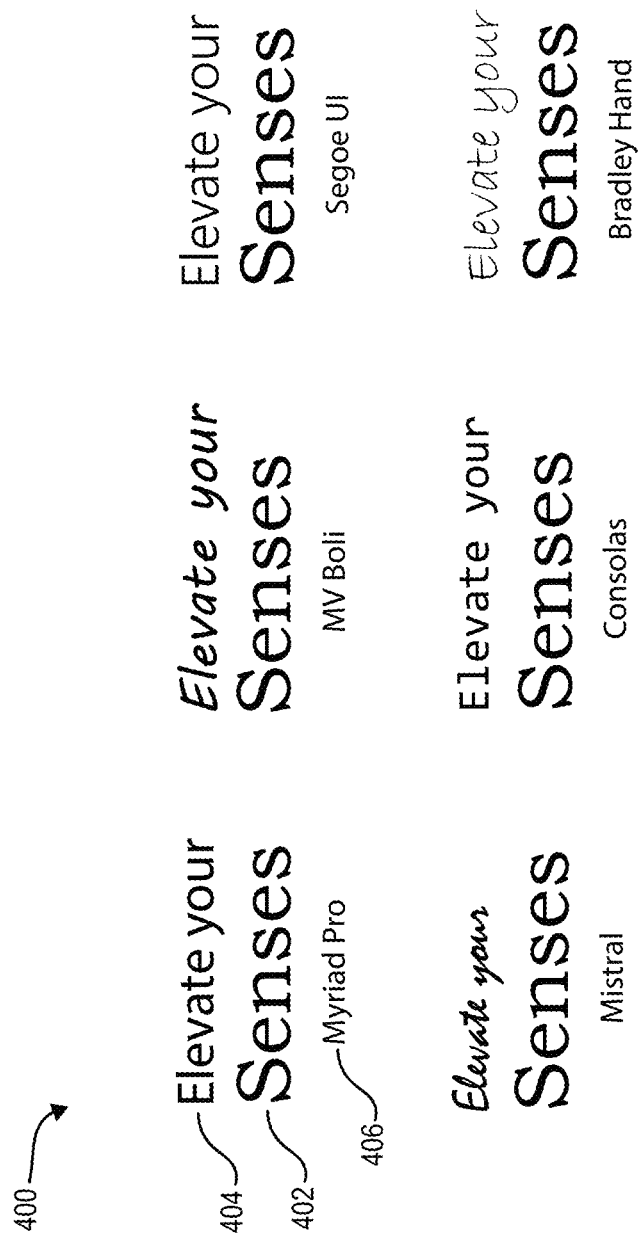
FIG. 4 illustrates examples of font pairs in accordance with one or more embodiments.

As mentioned above, the asymmetric font pairing system 204 identifies visually aesthetic font pairs to present to a user. To illustrate, FIG. 4 shows examples of font pairs 400 in accordance with one or more embodiments. As shown in FIG. 4, the asymmetric font pairing system 204 identifies candidate fonts 404 based on an input font 402. For simplicity, only one of the font pairs 400 in FIG. 4 is labeled.

For example, a user generates an electronic document on a client device that includes an input header font (e.g., the input font 402) positioned below a default sub-header font. As with many electronic documents, the user can select and modify the spatial relationship between two sections of an electronic document. In addition, the client device can detect a request from the user to identify candidate sub-header fonts (e.g., the candidate font 404). In response, the client device can identify and present the font pairs 400 from locally stored fonts, as described above.

As shown, each font pair includes the same input font 402 positioned above a different candidate font 404. The spatial relationship can be based on user input (e.g., based on the user specifying the spatial location and/or relationship between two sections of an electronic document) or according to a default hierarchy (e.g., header/sub-header/body presented from top to bottom). Additionally, as shown, each font pair lists the font name 406 of the candidate font 404. The asymmetric font pairing system 204 can optionally display the font name 406 to the user when presenting a candidate font 404.

FIGS. 5A-5D illustrate graphical user interfaces of providing candidate font pairs based on an input font in accordance with one or more embodiments. For example, a client device 500 displays multiple graphical user interfaces 502a-d of an application that provides font pairs to a user. Each of the graphical user interfaces 502a-d include a font pairing toolbar 504, a list of font pairs 506, and an electronic document 508 among other graphical elements. The following description describes the client device 500 performing various actions. One will appreciate that this is short hand for computer-readable instructions of the asymmetric font pairing system 204 being executed by the client device 500 to cause the client device 500 to perform the various actions.

Figure 5A:
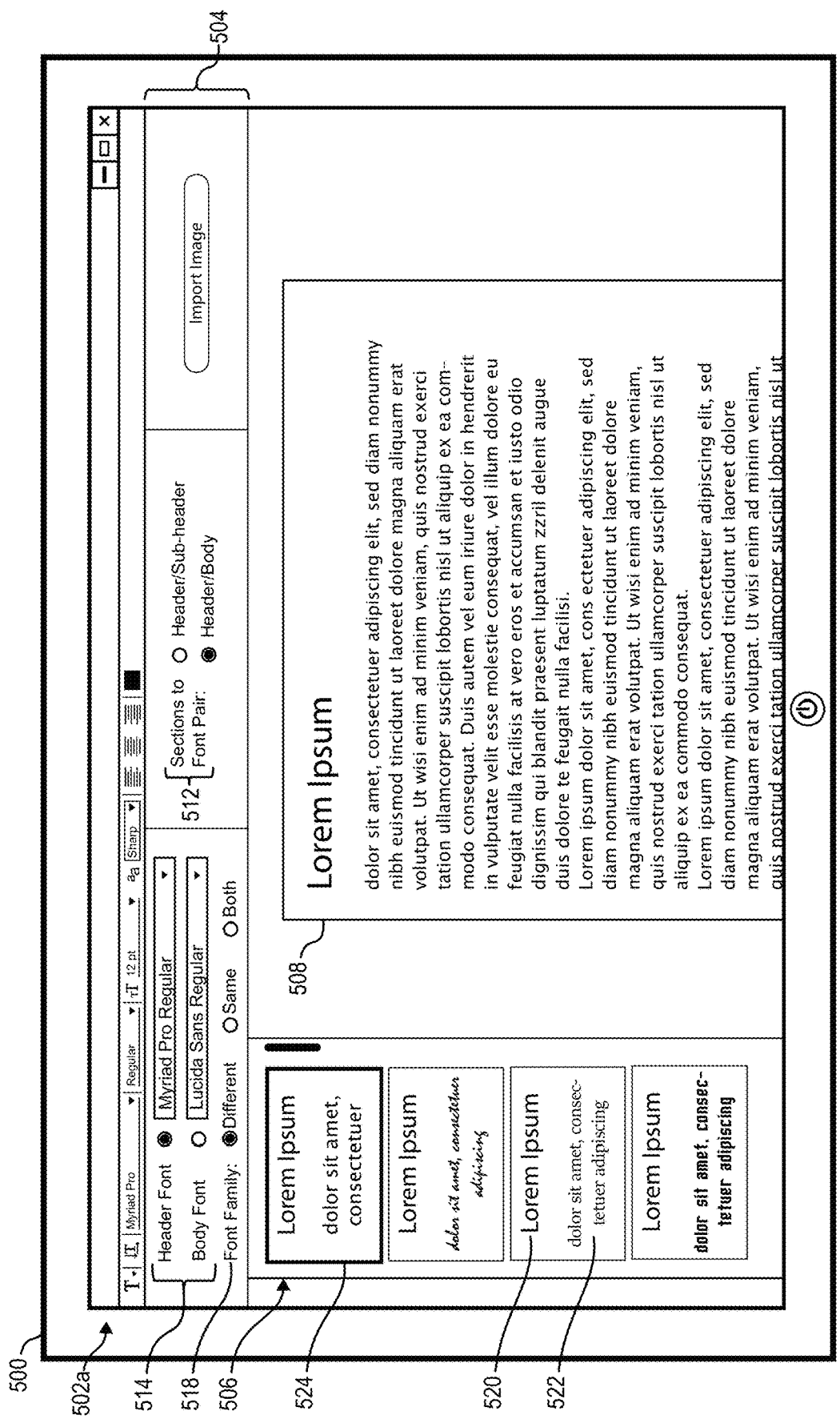
FIGS. 5A-5D illustrate user interfaces of providing candidate font pairs based on an input font in accordance with one or more embodiments.

As shown in the graphical user interface 502a in FIG. 5A, the font pairing toolbar 504 includes various selectable elements (e.g., buttons, radio buttons, and drop-down menus) that enable a user to specify an input font and which sections within the electronic document 508 to provide font pairs. For instance, the font pairing toolbar 504 includes a section pairing option 512 where a user can specify a font pairing between the header/sub-header sections of the electronic document 508.

In addition, the font pairing toolbar 504 includes an input font option 514 where a user can specify the header font or the body font as the input font (e.g., either by selecting a radio button or a font from a corresponding drop-down menu). In some embodiments, the input font option 514 updates based on the selecting of the section pairing option 512, as shown below in FIG. 5D. Further, the font pairing toolbar 504 includes a font family option 518 where a user can specify whether to limit potential candidate fonts to the same and/or different family from the input font.

Upon detecting a user selecting a section pairing option 512 and an input font option 514, the client device 500 can update the graphical user interface 502a to populate the list of font pairs 506. The list of font pairs 506 includes multiple font pairs, where each font pair includes an input font 520 and a candidate font 522. Further, upon the client device 500 detecting a selected font pair 524 (as indicated by the bold outline), the client device 500 can update the electronic document 508 in the graphical user interface 502a to reflect the input font and the candidate font from the selected font pair 524. In addition, the client device 500 can update the non-selected option on the input font option 514 to indicate the name of the candidate font in the selected font pair 524.

To illustrate, the graphical user interface 502a in FIG. 5A shows a selection of the header/body section pairing (e.g., section pairing option 512) with a selection of the header font (i.e., Myriad Pro Regular) as the input font (e.g., input font option 514). Based on the user inputs, the asymmetric font pairing system 204 identifies candidate fonts, as described above, and provides the candidate body fonts paired with the input header font in the list of font pairs 506. In some embodiments, the client device 500 orders font pairs in the list of font pairs 506 according to the font pairing scores, as described above. In alternative embodiments, the client device 500 orders font pairs in the list of font pairs 506 based on the popularity of a candidate font, reverse popularity, alphabetically, or by some other order.

As further illustrated, the list of candidate fonts includes a selection of the first font pair, which includes the input font 520 (i.e., Myriad Pro Regular) and a candidate font 522 (i.e., Lucida Sans Regular). In response, the client device 500 updates the electronic document 508 to populate the header section with the font Myriad Pro Regular and the body section with the font Lucida Sans Regular. In addition, the client device 500 updates the name of the body font in the input font option 514 to show the selected candidate font as Lucida Sans Regular.

In one or more embodiments, the client device automatically updates the selections in the font pairing toolbar 504 as the user interacts with the text/characteristics in the electronic document 508. For example, as the user edits the body section, the client device 500 updates the input font option 514 to select the body font as the input font. Further, in response to the client device 500 updating the input font option 514, the client device 500 can also update the list of font pairs 506 to show body/header font pairings. Thus, in these embodiments, the asymmetric font pairing system 204 automatically detect, identifies, and presents font pairs to a user as the user interacts with the client device 500.

Figure 5B:
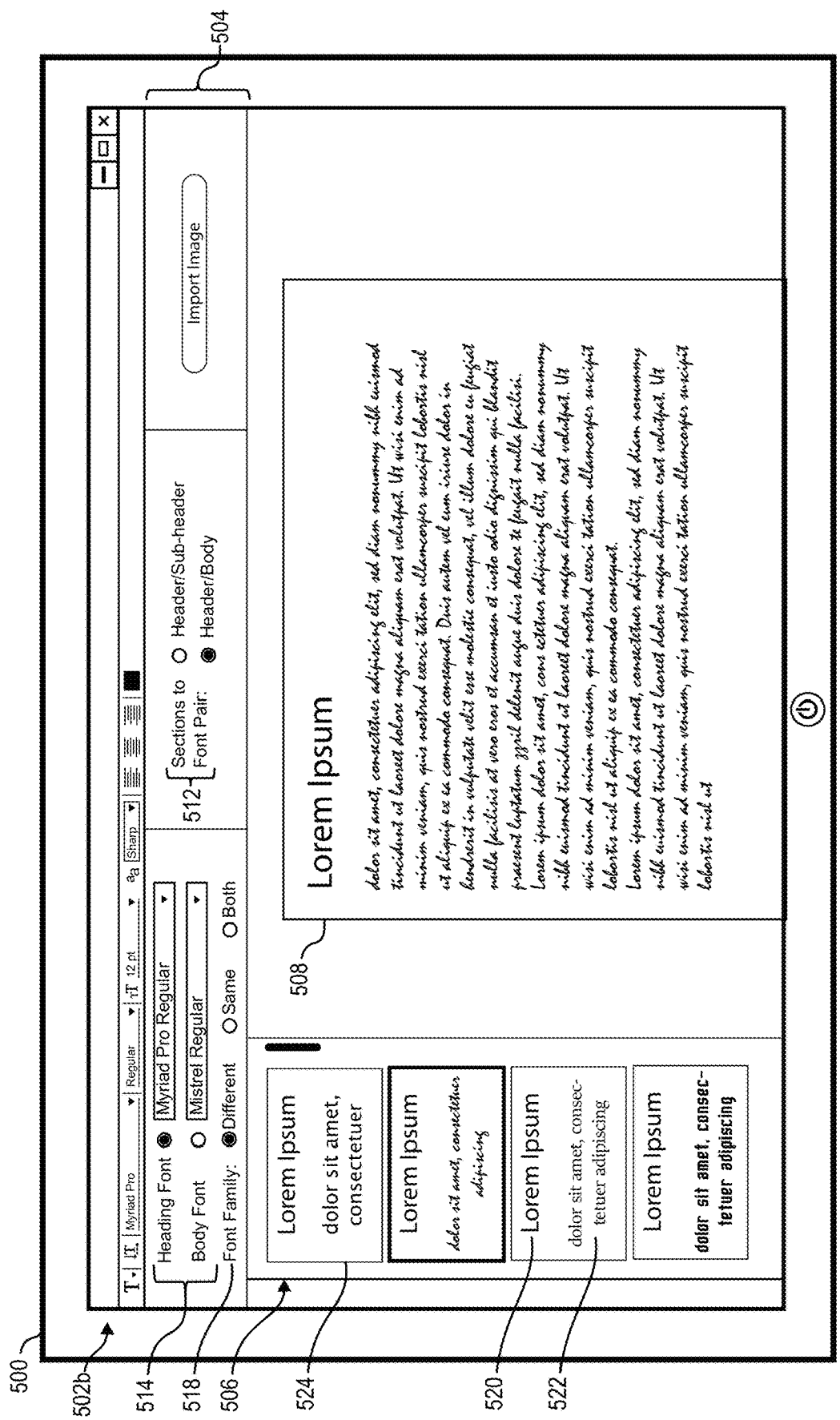

As shown in FIG. 5B, the client device 500 updates the graphical user interface 502b based on detecting the user selecting a different selected font pair 524. As shown, the user selects the second font pair in the list of font pairs 506. In response, the client device 500 updates the sections of the electronic document 508 to match the fonts in the selected font pair 524. The client device 500 also updates the input font option 514 in the font pairing toolbar 504 to reflect the updated selected candidate font (i.e., Mistrel Italic).

As the user selects different font pairs, the client device 500 can continue to update the electronic document 508 to match the selected font pair 524. In some embodiments, the client device 500 updates multiple occurrences of a section in the electronic document with the candidate font in the selected font pair 524. For instance, the client device 500 updates each body section in the electronic document to be Mistrel Italic. In alternative embodiments, the 500 only updates a visible or selected body section of the electronic document 508.

As mentioned above, the user can change which section includes the input font in the input font option 514 of the font pairing toolbar 504. As shown in the graphical user interface 502c of FIG. 5C, the client device 500 detects a selection of the body font as the input font. As noted above, in some embodiments, the client device 500 automatically updates the input font option 514 based on the user interacting with the body font section within the electronic document 508. In alternative embodiments, the user manually selects the body font as the input font using the radio button or by selecting a body font from the drop-down menu in the input font option 514.

In response to detecting of the body font being selected as the input font, the client device 500 modifies the graphical user interface 502b to reflect an updated list of font pairs 506. As shown in the list of font pairs 506, each of the body fonts are the same (e.g., Lucida Sans Regular) while the header fonts vary between the matching font pairs. In this manner, in each matching pair, the body font has become the input font 520, and the header font has become the candidate font 522.

Figure 5C:
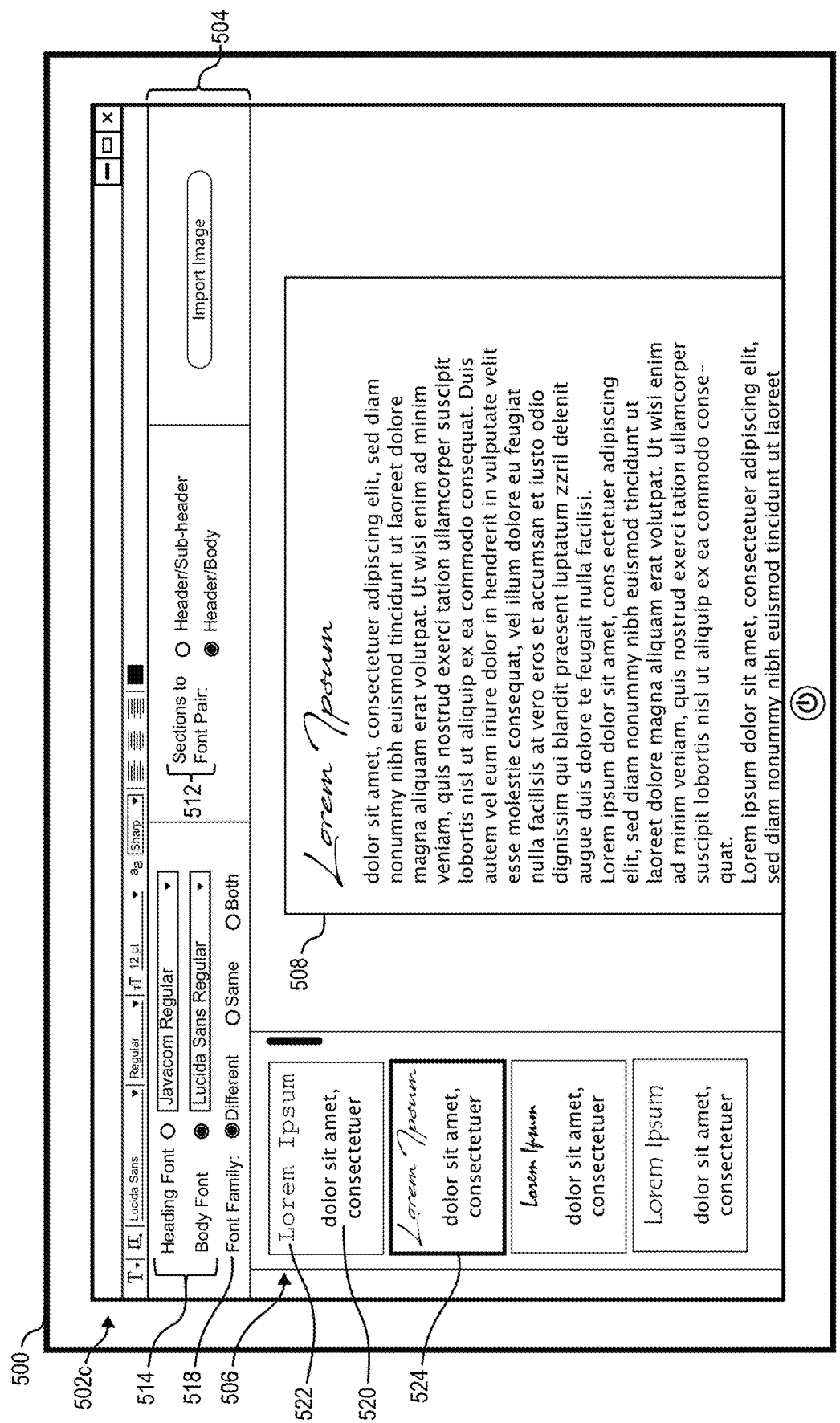

As also shown in FIG. 5C, the client device 500 detects the selection of a selected font pair 524. In response, the client device 500 updates the electronic document 508 to incorporate the candidate font 522 from the selected font pair 524 (e.g., Javacom Regular). In some embodiments, upon the user changing the input font option 514, the client device 500 automatically selects a font pair from the list of font pairs 506 and applies the selected font pair 524 to the electronic document 508. In other embodiments, the client device 500 only updates the electronic document 508 upon the user manually selecting a font pair. Further, in some embodiments, the graphical user interface 502c (and/or the other graphical user interfaces described herein) includes a "back," "undo," or "clear" option to restore the electronic document 508 to the previously employed fonts before the user selected a font pair.

As mentioned above, font pairings between two sections of an electronic document are asymmetric. Nevertheless, the client device 500 can employ the same symmetric compatibility space and asymmetric compatibility space to determine font pairs when a user changes the input font option 514 (e.g., from the header font as the input font to the body font as the input font) provided the section pairing option 512 remains the same. Further, if a user does change the section pairing option 512, the client device 500 can likewise use the corresponding compatibility spaces to determine font pairs for the updated dependent claim section pairing. As discussed above, because the compatibility spaces require little memory to store on a client device, a client device can easily store multiple sets of compatibility spaces.

Figure 5D:
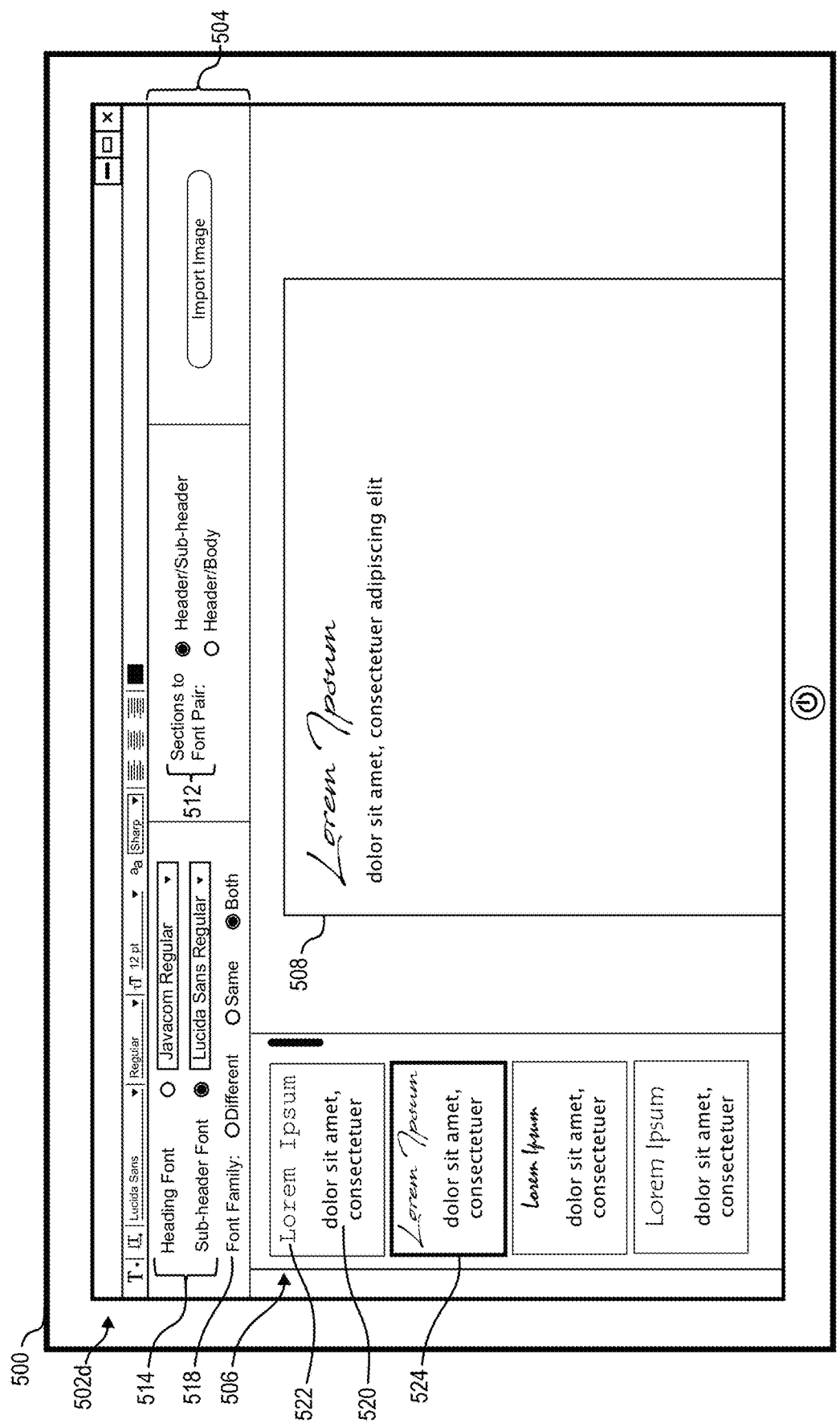

As shown in FIG. 5D, the client device 500 can detect a selection change in the section pairing option 512. For example, the graphical user interface 502d illustrates a change in the section pairing option 512 to the "Header/Sub-header" option. In response, the client device 500 updates the input font option 514 to include the header font and the sub-header font. In this manner, based on user input, the client device 500 can provide font pairs for different section pairings of an electronic document as well as different font pairs based on which section includes the input font.

In various embodiments, the asymmetric font pairing system 204 can enable the client device 500 to provide font pairs between the same section or same types of sections within the electronic document 508. For example, the section pairing option 512 includes a "Header/Header" or a "Body/Body" option, where the client device 500 similarly provides font pairs as described above.

Figure 6A:
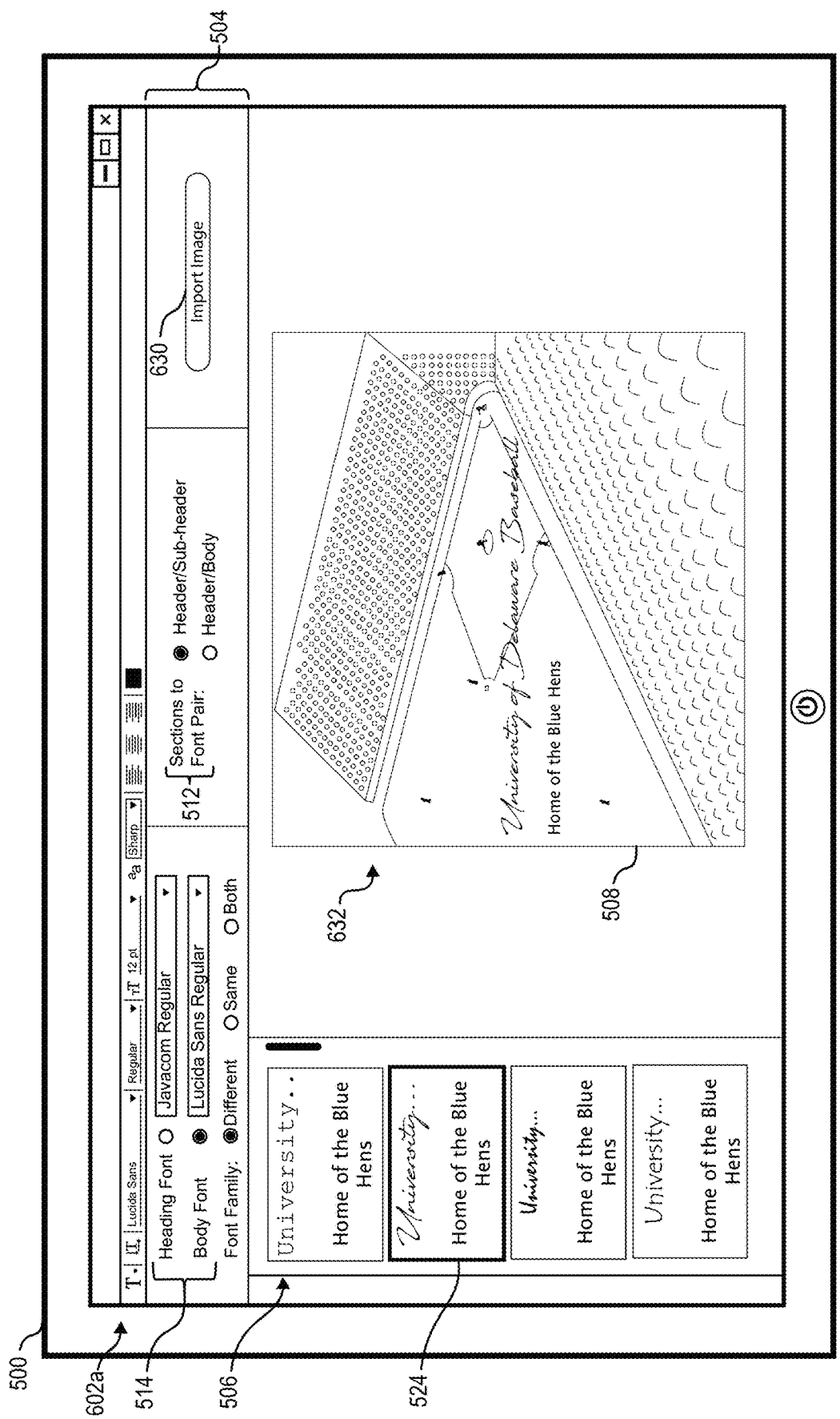
FIGS. 6A-6B illustrate additional user interfaces of providing candidate font pairs based on an input font in accordance with one or more embodiments.
Figure 6B:
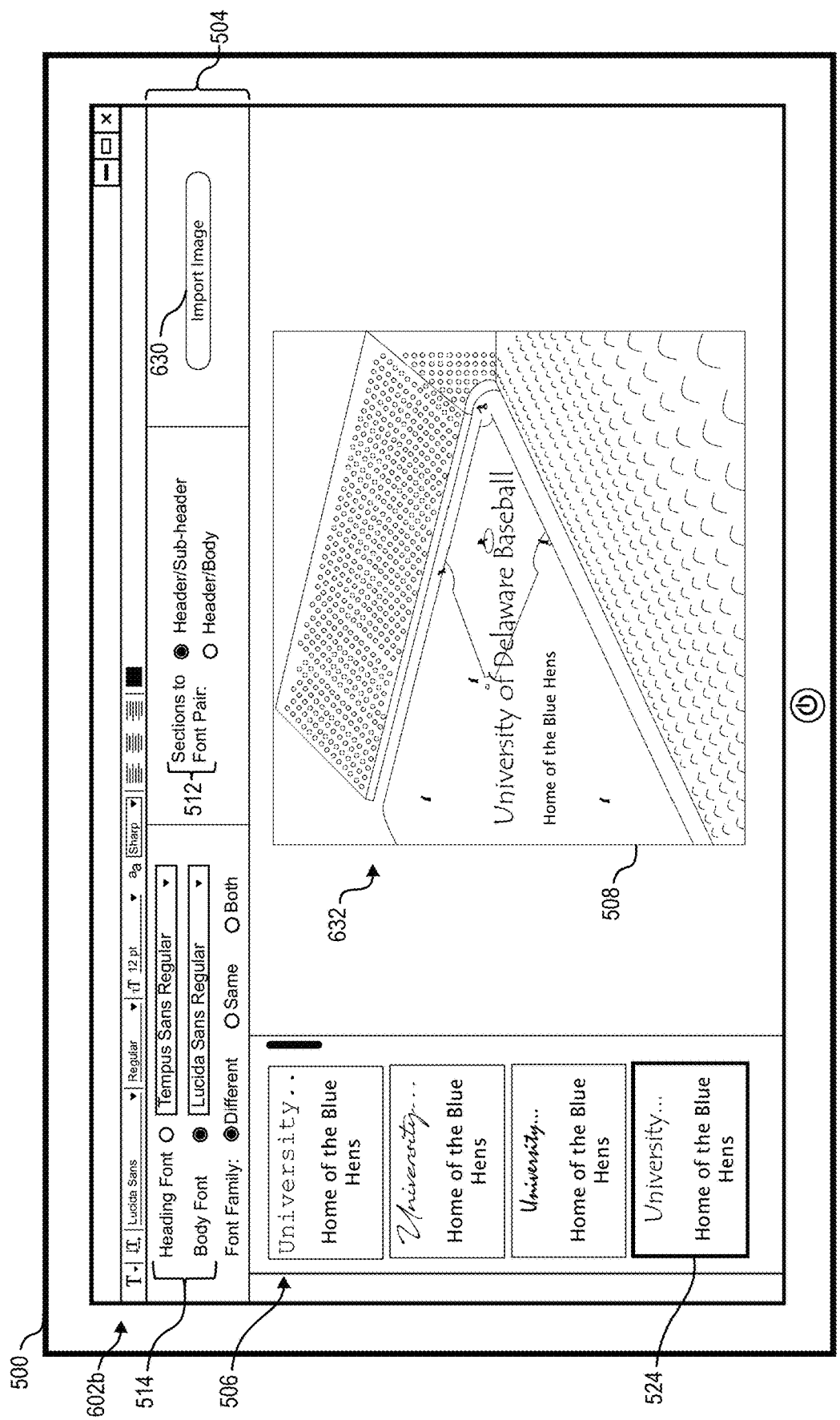

In one or more embodiments, the client device 500 enables a user to also add and preview images within an electronic document in connection with various font pairs. To illustrate, FIGS. 6A and 6B show additional graphical user interfaces of providing candidate font pairs based on an input font in accordance with one or more embodiments. For simplicity, FIGS. 6A and 6B use the client device 500 and graphical elements described above with respect to FIGS. 5A-5D. For example, the client device 500 in FIGS. 6A and 6B include the font pairing toolbar 504, list of font pairs 506, and the electronic document 508.

As shown in FIG. 6A, the client device 500 displays a graphical user interface 602a that includes an import image option 630 in the font pairing toolbar 504. Upon detecting a user selecting the import image option 630, the client device 500 facilitates the user selecting a graphic or image 632 to add to the electronic document 508. After the client device 500 adds an image 632 to the electronic document 508, the user can interact with the font pairing toolbar 504, as described above to view different visually aesthetic font pairs in connection with the image 632. In alternative embodiments, the client device 500 enables a user to view font pairs overlaid a default or generic image.

To illustrate, in FIG. 6A, the selected font pair 524 includes the header font Javacom and the sub-header font of Lucida Sans. Accordingly, the graphical user interface 602a shows the electronic document 508 employing these fonts. Upon the selected font pair 524 changing, as shown in FIG. 6B, the client device 500 updates the graphical user interface 602b to show the updated header candidate font within the electronic document 508.

As also shown in FIGS. 6A and 6B, the list of font pairs 506 includes text that matches the text in the electronic document 508. In one or more embodiments, the client device 500 copies the text, or a portion of text, from the respective sections of the electronic document 508 to display a preview of each font pair in the list of font pairs 506. In addition, the client device 500 can display default text in the font pairs. For instance, if the body section in the electronic document 508 does not yet include text or an insufficient amount of text (e.g., less than two words or five characters), the client device 500 can populate the body text of each font pair with default or random body text.

Figure 7A:
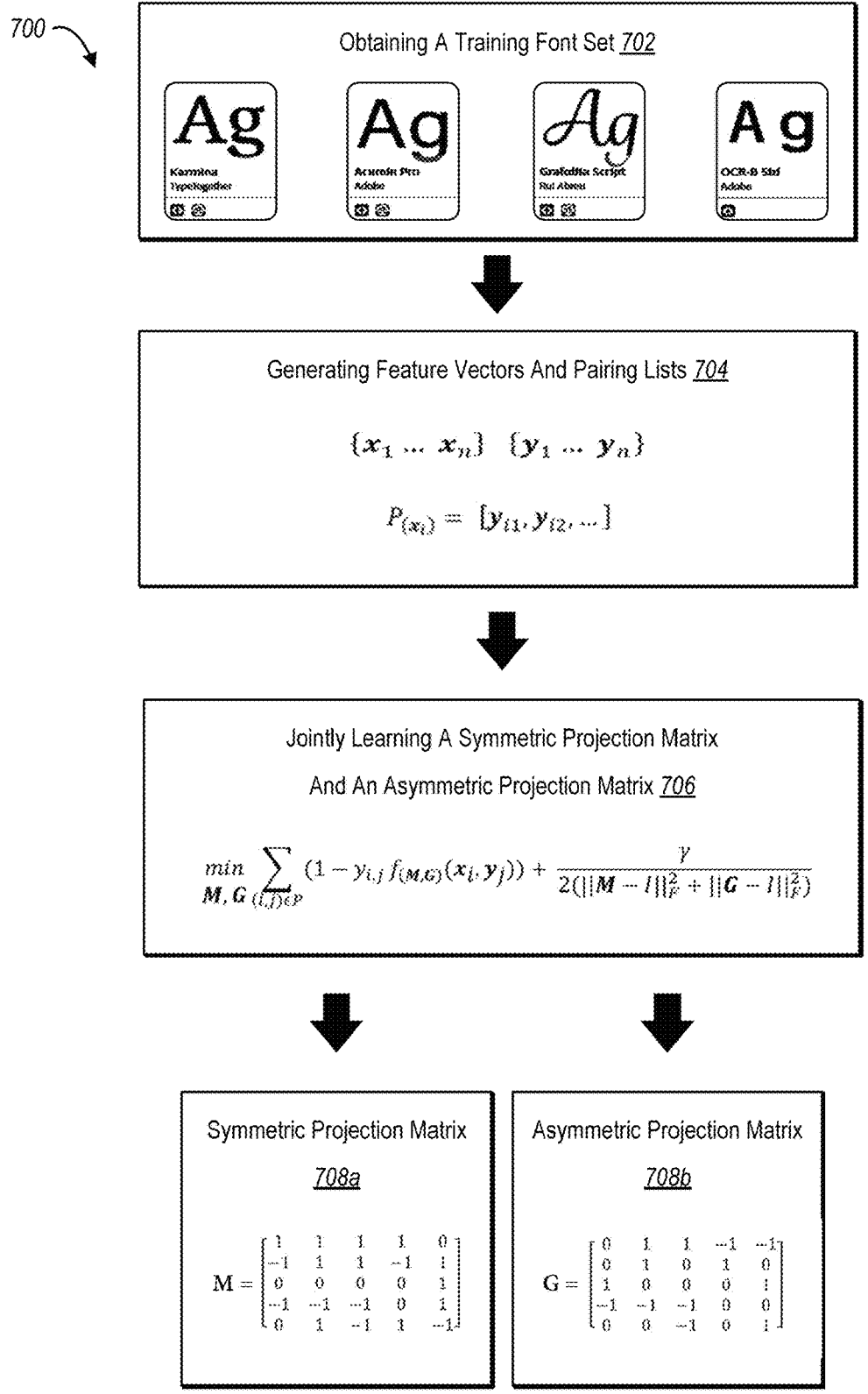
FIG. 7A illustrates acts in performing a step for jointly learning a symmetric projection matrix and an asymmetric projection matrix based on feature vectors in accordance with one or more embodiments.

Turning now to FIGS. 7A and 7B, additional detail is provided regarding jointly learning the symmetric compatibility space and the asymmetric compatibility space as well as using the compatibility spaces to identify visually aesthetic font pairs. In particular, FIG. 7A illustrates acts 702-706b in connection with performing a step 700 for learning a symmetric projection matrix and an asymmetric projection matrix based on the feature vectors. FIG. 7B illustrates acts 712-716 in connection with performing a step 710 for determining one or more output fonts that pairs with the input font based on the symmetric projection matrix and the asymmetric projection matrix. As with other figures, while the description of FIGS. 7A and 7B correspond to font pairings between header fonts and body fonts, the same act applies to other document section combinations.

As illustrated in FIG. 7A, the asymmetric font pairing system 204 obtains 702 a training font set. For example, the asymmetric font pairing system 204 identifies a set of human curated electronic documents that includes font used as header fonts and body fonts (or between fonts in other sections in the electronic documents). The header fonts and the body fonts in the training font set can be the same set or a different set of fonts.

Upon identifying the training font set, the asymmetric font pairing system 204 generates 704 feature vectors and pairing lists for the fonts in the training font set. For example, in one or more embodiments, the asymmetric font pairing system 204 employs a neural network to generate a feature vector for each font in the font set. For instance, the asymmetric font pairing system 204 employs a convolutional neural network and/or the DeepFont model to obtain feature vectors for the fonts in the training set. As shown, the asymmetric font pairing system 204 determines m training header fonts with feature vectors $\{x_1, \ldots, x_m\}$, and n training body fonts with features $\{y_1, \ldots, y_n\}$.

In alternative embodiments, the asymmetric font pairing system 204 generates feature vectors for fonts in the training font set without the use of a neural network. For example, the asymmetric font pairing system 204 identifies low-level numerical font metrics for different font characteristics for each font. For instance, the asymmetric font pairing system 204 identifies the font size, width, weight, and other numerical characteristics. Further, the asymmetric font pairing system 204 can use Boolean metrics to indicate whether a font has a particular style (e.g., bold, italic, underlined, or regular), contrast, name, and/or capitalization style. In some embodiments, the asymmetric font pairing system 204 accesses low-level numerical font metrics or metadata from a font file associated with the font. In this manner, the asymmetric font pairing system 204 can generate feature vectors for each font in the training set.

In some embodiments, the asymmetric font pairing system 204 obtains a feature vector for a font from a font repository. For example, using the font name or another font identifier, the asymmetric font pairing system 204 accesses a feature vector for the font from a local (or external) repository. In some cases, the asymmetric font pairing system 204 hosts a font repository of feature vectors for fonts and provides the feature vectors to requesting devices (e.g., a client device that requests a feature vector for a particular font).

In addition, in connection with generating or otherwise obtaining feature vectors, the asymmetric font pairing system 204 obtains lists of header/body font pairs within the training font set. As mentioned above, the training font set includes header/body pairs of fonts that indicate two fonts that have been together based on actual usage in an electronic document. In some cases, a header font is paired with the same body font multiple times in the training font set. In other cases, a header font is paired with multiple body fonts from the training font set.

Based on the header/body font pairs within the training font set, the asymmetric font pairing system 204 can determine 704 a list for each header font (and similarly each body font) that indicates each body font that paired with the header font in the training font set. If a header font is paired with the same body font multiple times in the training font set, the body font can be repeated in the list to indicate the increased popularity and frequency of use. As shown, for each header font $x_1$, the asymmetric font pairing system 204 creates a list of body fonts that pair with it, shown as $P(x_i)=[y_{i1}, y_{i2}, \ldots]$.

As shown in FIG. 7A, the asymmetric font pairing system 204 jointly learns a symmetric projection matrix and an asymmetric projection matrix based on the feature vectors. For instance, the asymmetric font pairing system 204 employs joint metric learning, as detailed below, to execute an objective function that determines the symmetric projecting matrix and the asymmetric projection matrix.

Moreover, the asymmetric font pairing system 204 can employ indicator functions to determine the symmetric projecting matrix and the asymmetric projection matrix. For example, the asymmetric font pairing system 204 generates pairing indicator functions that indicate when a first font is paired with a second font in the training font set in a given document section combination. In some embodiments, the asymmetric font pairing system 204 generates pairing indicator functions based on the font pairing lists mentioned above. For instance, given the fonts of $(x_i, y_j)$, the asymmetric font pairing system 204 generates a pairing indicator function $S(i,j)=1$ when the two fonts are paired in the training font set.

In some embodiments, the asymmetric font pairing system 204 also generates non-pairing indicator functions. For instance, while the font pairing lists indicate positive font pairings of which body fonts pair with a header font in the training font set (and vice versa), the training font set does not indicate negative font pairings. Accordingly, in some embodiments, the asymmetric font pairing system 204 randomly samples negative pairs among all the other possible pairs, excluding the aforementioned positive pairs. In general, the asymmetric font pairing system 204 generates roughly the same number of negative pairs as the number of positive pairs. For instance, given the fonts of $(x_i, y_j)$, the asymmetric font pairing system 204 generates a non-pairing indicator function $D(i,j)=1$ when fonts are negative pairs.

As mentioned above, the asymmetric font pairing system 204 jointly learns 706 a symmetric projection matrix and an asymmetric projection matrix based on the feature vectors and pairing indicators. The following provides an objection function that the asymmetric font pairing system 204 can employ to determine the symmetric projection matrix ("M") and an asymmetric projection matrix ("G").

$$\min_{M,G} \sum_{(i,j) \in P} (1 - y_{i,j} f_{(M,G)}(x_i, y_j)) + \frac{\gamma}{2(\|M - I\|_F^2 + \|G - I\|_F^2)} \quad (1)$$

As shown, the objective function solves for the optimized compact space of both the symmetric projection matrix M and the asymmetric projection matrix G based on each pairing and non-pairing font pair. In one or more embodiments, the objective function is a hinge loss function that employs empirical discrimination. Further, in some embodiments, the objective function includes the regularization term $\|M-I\|_F^2 + \|G-I\|_F^2$ to prevent too much feature vector from distortion. As also shown above, $\|\cdot\|$ is the Frobenius norm, and $\gamma$ is the trade-off parameter (e.g., 0.01). In addition, the asymmetric font pairing system 204 can solve the objective function using dual formulation.

Further, to solve the objective function, in one or more embodiments, the asymmetric font pairing system 204 employs pairwise constraints. In particular, the asymmetric font pairing system 204 employs $P = S \cup D$ to denote the index set of all pairwise constraints, where $y_{i,j}=1$ if $S(i,j)=1$ and $y_{i,j}=-1$ if $D(i,j)=1$. In this manner, the asymmetric font pairing system 204 further employs the indicator functions to determine the symmetric projection matrix 708a and the asymmetric projection matrix 708b, as mentioned above.

As mentioned above, the asymmetric projection matrix G is asymmetric. In this manner, the asymmetric projection matrix G provides measures between different properties of two fonts. For example, rather than measuring the distance between Characteristic A of Font A to Characteristic A of Font B, the asymmetric projection matrix G provides a measure between Characteristic A of Font A to Characteristic D of Font B. Further, the asymmetric projection matrix G provides different distances between two fonts depending on which font is designated as the input or query font.

Upon determining the symmetric projection matrix 708a and the asymmetric projection matrix 708b, the asymmetric font pairing system 204 can provide the two projection matrices to a client device. For example, the client device uses the symmetric projection matrix 708a and the asymmetric projection matrix 708b to determine font pairings based on a given font. In alternative embodiments, the asymmetric font pairing system 204 uses the two projection matrices to determine font pairings.

As mentioned above, FIG. 7B illustrates acts 712-716 in connection with performing a step 710 for determining one or more output fonts that pairs with the input font based on the symmetric projection matrix and the asymmetric projection matrix. The asymmetric font pairing system 204 or a client device, using instructions from the asymmetric font pairing system 204, can perform the step 710.

As shown in FIG. 7B, a client device (or the asymmetric font pairing system 204) receives 712 user input selecting an input font from a set of fonts. The set of fonts can include fonts stored on the client device, remotely stored fonts (e.g., in the cloud), or combinations of the foregoing. For example, the set of fonts can include a font repository maintained by the asymmetric font pairing system 204. As noted, the set of fonts is typically not the training font set described above, but can include one or more of the same fonts.

The client device can receive user input indicating an input font in connection with an electronic document. For example, the user specifies an input font within an electronic document. In connection with detecting the input font, the client device can also determine which section of the electronic document (e.g., document section type) to which the input font corresponds as well as the section for which the user desires a font pair. For example, the client device detects that the input font is a body font (e.g., corresponds to the body document section type) and the candidate fonts correspond to a sub-header section of the electronic document.

Upon receiving the input font, the client device determines 714 font pairs between the input font and the set of fonts. As described above, the client device can employ a scoring function provided by the asymmetric font pairing system 204 in connection with the symmetric projection matrix and the asymmetric projection matrix to identify font pairs. For example, the asymmetric font pairing system 204 provides the following adaptive scoring function to the client device.

$$f_{(M,G)}(x_i, y_j) = x^T G y - (x-y)^T M (x-y) \qquad (2)$$

As shown, the scoring function identifies the distance between two fonts in both the symmetric projection matrix M and the asymmetric projection matrix G. In particular, the scoring function includes the constraint $x^T G y$, which measures the compatibility (e.g., multidimensional distance) of font pairs. In addition, the constraint $x^T G y$ is an adaptive constraint threshold that adapts based on the current input font and a potential candidate font. In this manner, the adaptive scoring function identifies fonts for a target document section type based on an input font with an input document section type.

By using the adaptive scoring function provided by the asymmetric font pairing system 204, the client device can score font pairs between the input fonts and other fonts in the set of fonts (including pairing the input font with itself). Depending on the structure of the symmetric projection matrix M and the asymmetric projection matrix G, a low score or a high score can indicate the visually aesthetic measure of a font pair. Based on the font pairing scores, the client device orders the font pairs and identifies which pairs to provide to the user. For example, the client device presents the top ten scoring font pairs to the user. In some embodiments, the client device applies scoring thresholds and/or user provided filters when determining which font pairs to present.

As shown in FIG. 7B. the client device presents 716 font pairs to the user. In particular, the client device presents one or more output fonts that pairs with the input font. As illustrated, the font pairs show the same body font as the input font and different header fonts as candidate fonts. As previously described, the user can select a font pair, and the client device can apply the selected fonts to the appropriate sections of the electronic document. Alternatively, the user can select a new input font and/or document section type, and the client device can repeat step 710.

Figure 8:
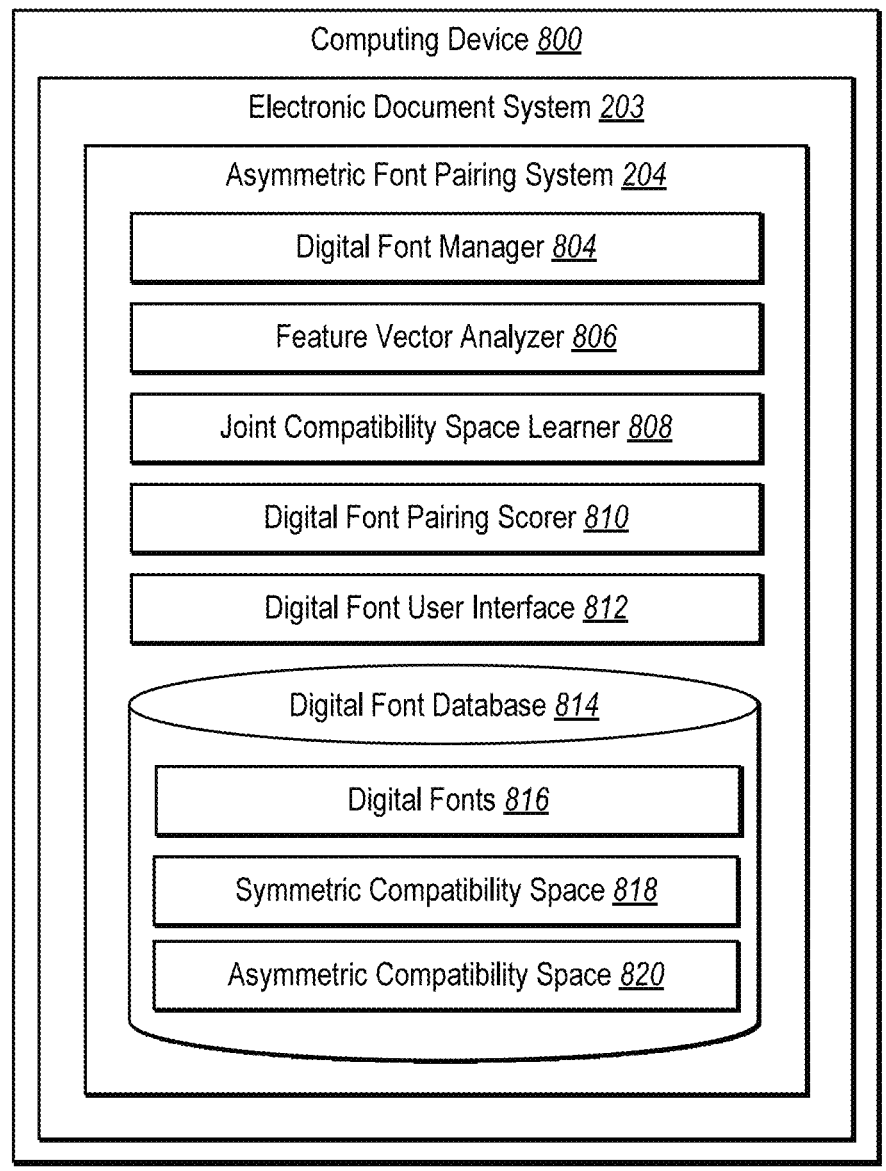
FIG. 8 illustrates a schematic diagram of the asymmetric font pairing system in accordance with one or more embodiments.

Referring now to FIG. 8, additional detail will be provided regarding capabilities and components of the asymmetric font pairing system 204 in accordance with one or more embodiments. In particular, FIG. 8 shows a schematic diagram of an example asymmetric font pairing system 204 architecture located within an electronic document system 203 and hosted on a computing device 800. The asymmetric font pairing system 204 can represent one or more embodiments of the asymmetric font pairing system described previously.

As shown, the asymmetric font pairing system 204 is located on a computing device 800 within an electronic document system 203. In general, the computing device 800 may represent various types of client devices. For example, in some embodiments, the client is a mobile device 800, such as a mobile telephone, a smartphone, a PDA, a tablet, a laptop, etc. In other embodiments, the computing device 800 is a non-mobile device, such as a desktop or server, or another type of client device. In some embodiments, portions of the computing device 800 correspond to computing devices of different types (e.g., some components operate on the computing device 800 when acting as a server device and some components operate on the computing device 800 when acting as a client device). Additional details with regard to the computing device 800 are discussed below as well as with respect to FIG. 13.

The electronic document system 203, in general, facilitates the creation, modification, sharing, and/or deletion of digital text, digital images, and/or designs (e.g., electronic documents). In one or more embodiments, the electronic document system 203 is a document processing application such as ADOBE® ACROBAT® or a word processing application. In other embodiments, the electronic document system 203 is a design application such as ADOBE® ILLUSTRATOR®. In some embodiments, the electronic document system 203 includes multiple applications, functions, and operations relating to fonts and documents having different section types, such as an application suite, an online forum, and/or a social networking platform accessed via the computing device 800. In addition, the electronic document system 203 and the asymmetric font pairing system 204 can include computer-executable instructions that, when executed by the computing device 800 cause the computing device 800 to perform a number of actions, as discussed in more detail below.

As illustrated in FIG. 8, the asymmetric font pairing system 204 includes various components. For example, the asymmetric font pairing system 204 includes a digital font manager 804, a feature vector analyzer 806, a joint compatibility space learner 808, a digital font pairing scorer 810, a digital font user interface 812 and a digital font database 814 that includes digital fonts 816, symmetric compatibility space 818, and asymmetric compatibility space 820. Each of these components is described below in turn.

The digital font manager 804 can store, receive, detect, installs, order, and/or organize fonts within the computing device 800. For example, in one or more embodiments, the digital font manager 804 stores a set of fonts on the computing device 800. In some embodiments, the digital font manager 804 maintains fonts within the digital font database 814 (e.g., digital fonts 816). For example, the digital font manager 804 maintains a training font set and/or a set of fonts that a user can employ in an electronic document. In various embodiments, the digital font manager 804 can identify and access additional fonts not stored or located on the computing device 800.

The feature vector analyzer 806 can create feature vectors for fonts in a font set. For instance, in one or more embodiments, the feature vector analyzer 806 employs a machine-learning algorithm and/or a convolutional neural network, as described above, to determine latent feature vectors for fonts in a training font set as well as other font sets stored on the computing device 800 (e.g., the digital font database 814). In some embodiments, the feature vector analyzer 806 identifies and/or generates feature vectors using low-level (e.g., non-latent) metrics, as previously described.

The joint compatibility space learner 808 can jointly learn latent (or non-latent) spaces based on the feature vectors. For example, the joint compatibility space learner 808 employs a machine-learning algorithm to jointly learn a symmetric compatibility space and an asymmetric compatibility space for fonts in a training font set between two sections (e.g., document section types) of an electronic document, as described above. The joint compatibility space learner 808 can store the compatibility spaces in the digital font database 814 as a symmetric compatibility space 818 and an asymmetric compatibility space 820. In various embodiments, the joint compatibility space learner 808 jointly learns a symmetric projection matrix and an asymmetric projection matrix, as described above.

The digital font pairing scorer 810 can determine which fonts in a font set pair with an input font. In one or more embodiments, the digital font pairing scorer 810 generates and/or employs a scoring function based on the two compatibility spaces and/or projection matrices, as described above, to determine font pairs for a given input font. In addition, the digital font pairing scorer 810 can determine font pairs for a second document section type (e.g., header) given a first document section type (e.g., body) corresponding to the input font. In various embodiments, digital font pairing scorer 810 determines which font pairs to provide to the user based on the corresponding font scores.

The digital font user interface 812 can provide font pair options to a user within an electronic document. For example, in one or more embodiments, the digital font user interface 812 enables a user to select an input font and a document section (e.g., document section type) for which to provide font pair results. In some embodiments, the digital font user interface 812 also applies and displays changes in an electronic document when a user selects a font pair, as described above. In additional embodiments, the digital font user interface 812 provides previews of font pairs to a user, as previously described.

Each of the components 804-820 of the asymmetric font pairing system 204 can include software, hardware, or both. For example, the components 804-820 can include one or more instructions stored on a computer-readable storage medium and executable by processors of one or more computing devices, such as a client device or server device. When executed by the one or more processors, the computer-executable instructions of the asymmetric font pairing system 204 can cause the computing device(s) to perform the feature learning methods described herein. Alternatively, the components 804-820 can include hardware, such as a special-purpose processing device to perform a certain function or group of functions. Alternatively, the components 804-820 of the asymmetric font pairing system 204 can include a combination of computer-executable instructions and hardware.

Furthermore, the components 804-820 of the asymmetric font pairing system 204 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 804-820 may be implemented as a stand-alone application, such as a desktop or mobile application. Furthermore, the components 804-820 may be implemented as one or more web-based applications hosted on a remote server. The components 804-820 may also be implemented in a suite of mobile device applications or "apps." To illustrate, the components 806-816 may be implemented in an application, including but not limited to ADOBE ACROBAT®, ADOBE® ILLUSTRATOR®, ADOBE PHOTOSHOP®, ADOBE® CREATIVE CLOUD® software. "ADOBE," "ACROBAT," "ILLUSTRATOR," "PHOTOSHOP," and "CREATIVE CLOUD" are either registered trademarks or trademarks of Adobe Systems Incorporated in the United States and/or other countries.

Figure 9:
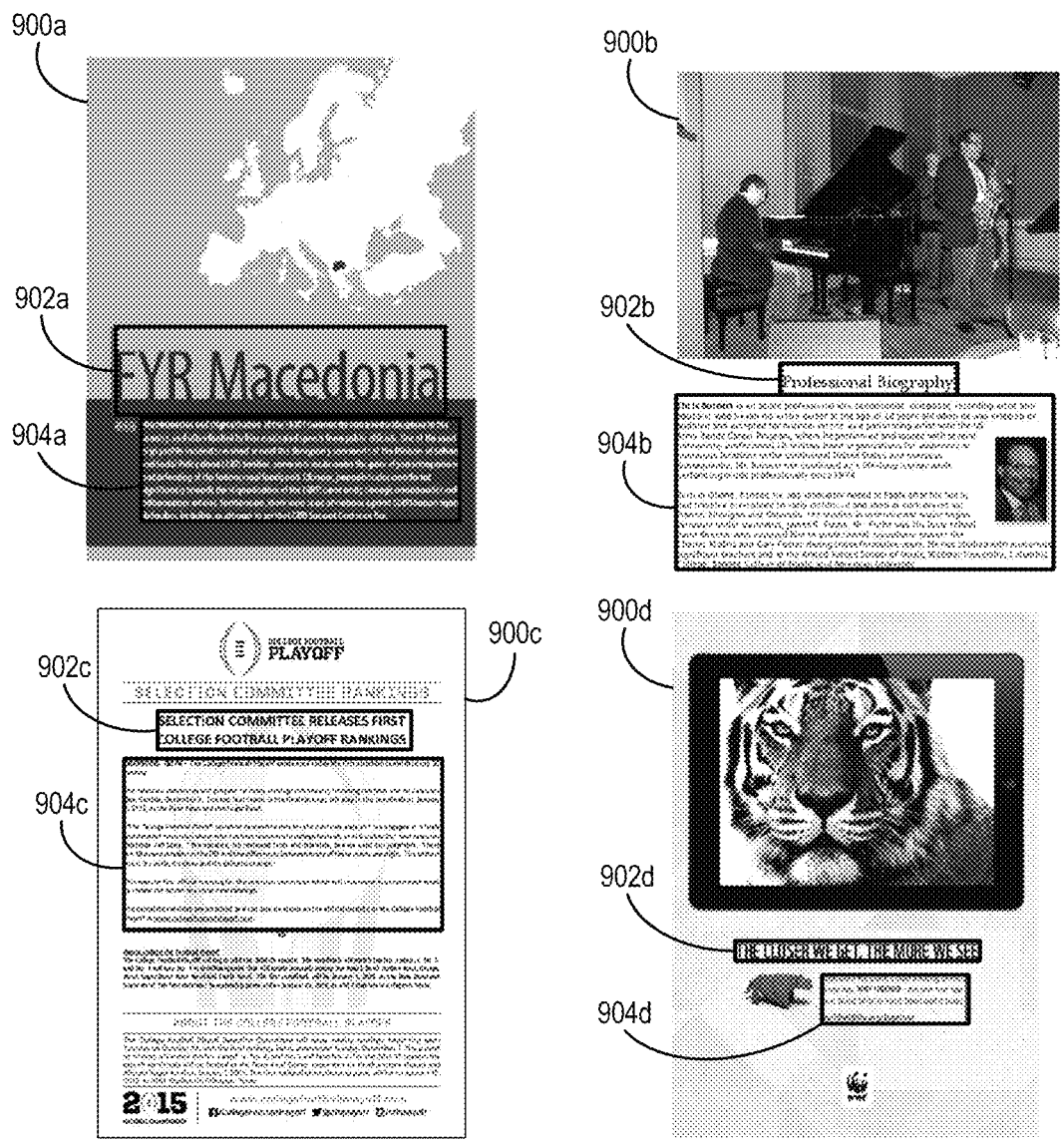
FIG. 9 illustrates documents used to create a training font set in accordance with one or more embodiments.

Turning now to FIG. 9, additional detail is provided regarding generating a training font set. In particular, FIG. 9 illustrates the asymmetric font pairing system 204 creating a training font set based on electronic documents in accordance with one or more embodiments. As shown, FIG. 9 includes multiple electronic documents 900a-d that include multiple document section types that include fonts. For example, the electronic documents 900a-d include a header font in a header section 902a-d and a body font in a body font section 904a-d.

In one or more embodiments, to create a training font set that includes previous font pairs between header fonts and body fonts (or for fonts between other document sections), the asymmetric font pairing system 204 collects millions of electronic documents (e.g., PDF document pages). In general, electronic documents, such as PDF documents, provide various layout, topics, and font styles that result in a well-rounded training font set. Using the collection of electronic documents, the asymmetric font pairing system 204 analyzes each electronic document to identify header and body font pairs as well as other font pairs (e.g., header and sub-header font pairs).

In alternative embodiments, the asymmetric font pairing system 204 analyzes web pages for font pairs. However, most web pages either follow simple standard templates using a small number of web fonts or embed font choices into very heterogeneous layouts that are difficult to aggregate. As a further alternative, rather than creating a training font set, the asymmetric font pairing system 204 identifies font pairs from existing training font sets. However, like web pages, many existing training font sets are too small and provide unbalanced font pairing lists.

Upon obtaining the collection of PDF document pages, in one or more embodiments, the asymmetric font pairing system 204 preliminarily filters out the collection to identify PDF document pages that are easily accessible, such as identifying parsed documents that include layout information. In addition, the asymmetric font pairing system 204 identify text boxes that include several words of text having the same font characteristics (e.g., font style and size). In one or more embodiments, the asymmetric font pairing system 204 dismisses PDF document pages that include fewer than two text boxes. Further, the asymmetric font pairing system 204 dismisses PDF document pages that do not use the Roman alphabet.

In some embodiments, to detect a header and sub-header pair on a page, the asymmetric font pairing system 204 finds and classifies the text box having the largest font as a header font. The asymmetric font pairing system 204 then identifies and classifies the text box with the next largest font within a fixed threshold of the header font box as a sub-header font. Based on the identified header font and the sub-header font, the asymmetric font pairing system 204 forms a header/sub-header font pair, and extracts the fonts from the two text boxes.

In addition, the asymmetric font pairing system 204 detects body text boxes by finding text boxes that contain more than a threshold number of characters (e.g., at least 100 characters) or words (e.g., at least 25 words). The asymmetric font pairing system 204 includes the body font from the body text box nearest to the header as a header/body font pair in the training font set. FIG. 9 illustrates header/body font pairs between header text boxes (e.g., header section 902*a-d*) and corresponding body text boxes (e.g., body font section 904*a-d*) in the PDF document pages (i.e., electronic documents 900*a-d*).

In various embodiments, the asymmetric font pairing system 204 evaluates the accuracy of the training font set. For example, the asymmetric font pairing system 204 compares labeling from a small subset of manually label header/body and header/sub-header pairs (e.g., 20 PDF documents totaling 3,000 pages) to the automatically label detection used in the training font set. If the results of the comparison above a verification threshold (e.g., 80% or 95% precision of accurate labels), the asymmetric font pairing system 204 can determine that the training font set is acceptable for joint learning, as described above, or other types of training.

In some instances, researchers can perform additional verifications to evaluate the training font set. For example, for the present disclosure, researchers conducted a study to compare whether designer users and ordinary users prefer the real font pairs detected from PDFs or the random alternatives. This study included 50 participants—5 experts in graphic design (i.e., designer) and 45 non-designers with other backgrounds.

In particular, the study included a set of paired comparisons. In each comparison, a participant was shown two images of the same layout with a font pair, but with one of the fonts in the pair changed. In particular, either the header or sub-header font was replaced by selecting a random alternative. The participant was then asked which design they prefer. The study included additional variations.

The results of the study indicated that experts prefer the original layout used in the training font set 75% of the time while non-experts preferred the original layout 50-60% of the time depending on the variation. From these results, the researchers determined that the font pairs included in the training font set are well-chosen. Further, the researchers determined that the study results also suggest that non-experts are much less sensitive to good font choices than experts, and that there is a need for automatically recommending good font pairs to them, as disclosed above.

Figures 10A, 10B:
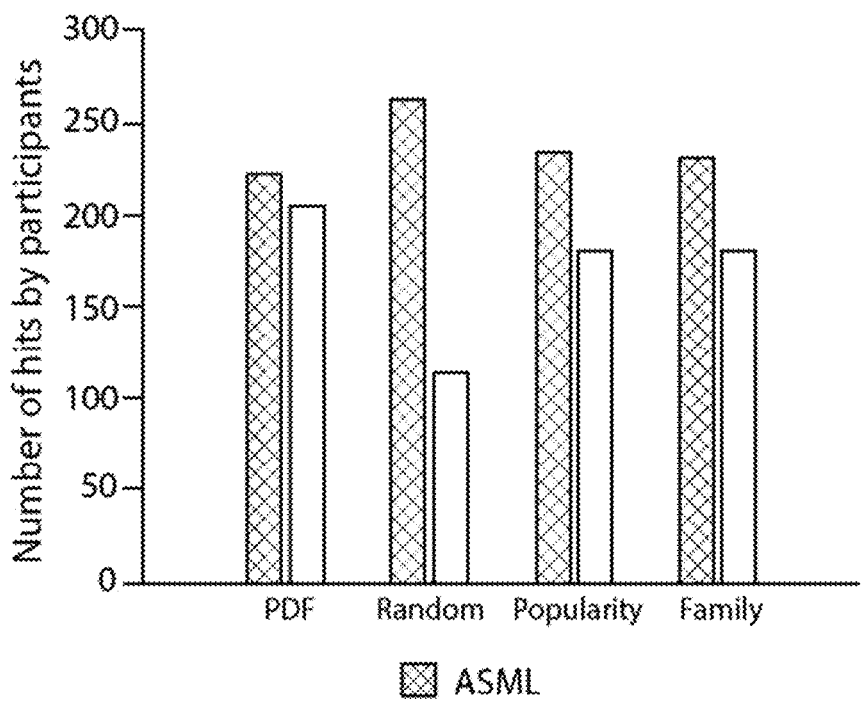
FIGS. 10A and 10B illustrates font pairing comparisons between one or more embodiments of the asymmetric font pairing system and conventional systems.

Along similar lines, the researchers conducted additional studies to evaluate the results of the asymmetric font pairing system 204 disclosed above. A few of the results are displayed in FIGS. 10A and 10B. In particular, FIG. 10B illustrates visual font pairing comparisons between one or more embodiments of the asymmetric font pairing system 204 and conventional systems. FIG. 10A illustrates a graph of participants ranking font pairs by one or more embodiments of the asymmetric font pairing system 204 over other methods. The following is a summary of a study performed by the researchers that demonstrates the superiority of the asymmetric font pairing system 204 (labeled as "ASML") over conventional systems.

For context, the other methods compared were font pairs from the PDF training font set (labeled as "PDF"), font pairs based on popularity (e.g., selecting body fonts based on frequency of appearance in the training font set where the same body fonts are always recommended, regardless of the input header font) (labeled as "Popularity"), font pairs from the same family (e.g., header font and body/sub-header font are from same font family, such as pairing Arial-Bold with Arial-Italic)(labeled as "Same Family" or "Family"), and contrasting font pairs (e.g., randomly selecting body fonts with the lowest visual compatibility as an input header font based on distances within the symmetric compatibility space)(labeled as "Contrast").

The researchers conducted a set of experiments that evaluated the top recommended font pairs of various methods. Like the previous study, participants were shown font pairs between asymmetric compatibility metric learning (ASML) and the other methods. Each comparison provided a participant with the highest scored font pair using the asymmetric font pairing system 204 and a font pair from either PDF, Popularity, Family, or Contrast. The experiments included 500 comparisons with each comparison being rated by 11 participants on average from a pool of 150 participants.

As shown in FIG. 10A, the researchers provided the input header font of "NewBaskerville-BoldSC" and received recommended sub-header fonts. Each column in FIG. 10A shows three resulting font pairs for each method. The PostScript name of each sub-header font is shown below the corresponding font pair. In addition, FIG. 10A shows, in parentheses, the number of times the sub-header font appears in the unique font pairs. For example, Popularity largely recommends the same three sub-header fonts in over half of the recommended pairings. In contrast, ASML recommends font pairs that are both visually aesthetic while also not being the most popular/frequently used.

As shown in FIG. 10B, the number of times a user selects an ASML font pair or the other font pair (i.e., "hits"). As illustrated, when comparing ASML with PDF, Random, Popularity, Family, the results (i.e., ASLM/Other) are PDF 220/203, Random 261/144, Popularity 244/191, and Family 268/178. As shown, the participants consistently selected the ASML font pairing over other options. In addition, the researchers applied statistical analysis to verify that the participant ratings were consistent and significant (e.g., >99.95%).

FIGS. 1A-10B, the corresponding text, and the examples provide a number of different methods, systems, devices, and non-transitory computer readable media of the asymmetric font pairing system. In addition to the foregoing, one or more embodiments can also be described in terms of flowcharts comprising acts for accomplishing a particular result. For example, FIG. 11 and FIG. 12 may be performed with more or fewer acts. Further, the acts may be performed in differing orders. Additionally, the acts described herein may be repeated or performed in parallel with one another or parallel with different instances of the same or similar acts.

Figure 11:
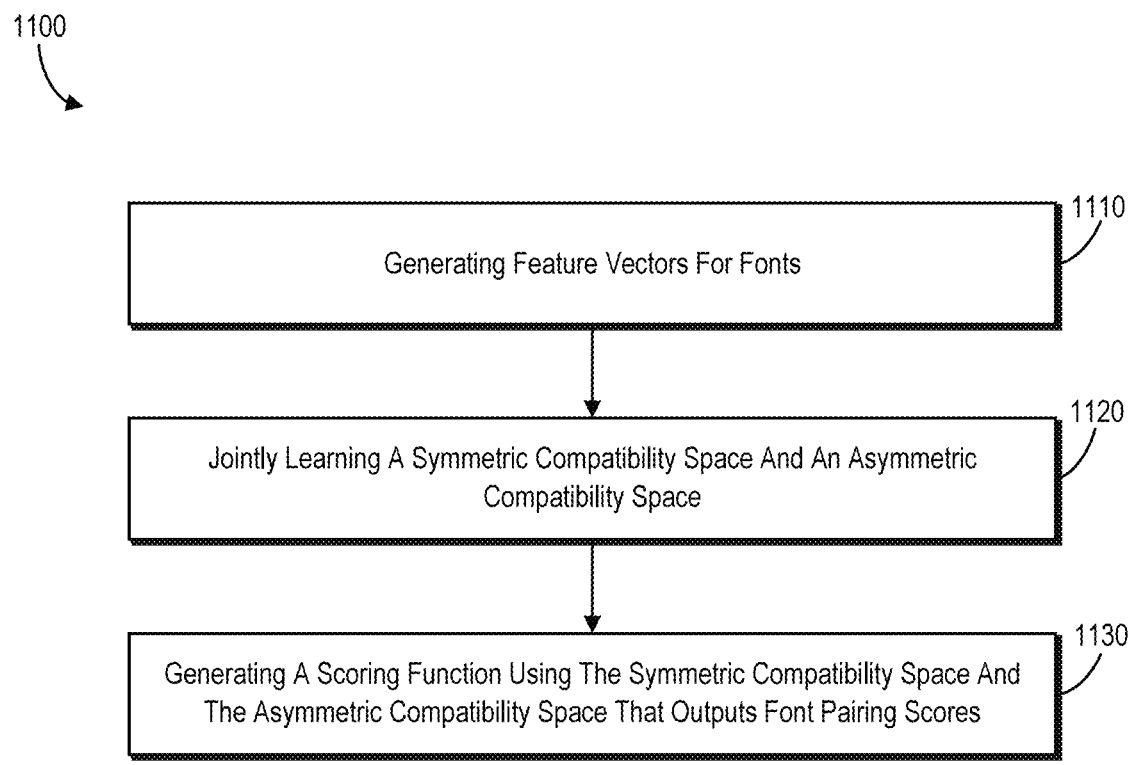
FIG. 11 illustrates a flowchart of a series of acts for jointly learning symmetric and asymmetric compatibility spaces in accordance with one or more embodiments.

As mentioned, FIG. 11 illustrates a flowchart of a series of acts 1100 of jointly learning symmetric and asymmetric compatibility spaces in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions that, when executed by one or more processors, cause a computing device to perform the acts of FIG. 11. In some embodiments, a system can perform the acts of FIG. 11.

In one or more embodiments, the series of acts 1100 is implemented on one or more computing devices, such as a server device(s) 202 or computing device 800. In addition, in some embodiments, the series of acts 1100 is implemented in a digital environment for creating or editing electronic documents. For example, the series of acts 1100 is implemented on a computing device having memory that stores a training font set that includes a plurality of digital fonts and indications of font pairs within the training font set.

The series of acts 1100 includes an act 1110 of generating feature vectors for fonts. In particular, the act 1110 can involve generating feature vectors for the plurality of digital fonts from the training font set. In some embodiments, the act 1110 includes generating feature vectors for the plurality of digital fonts using a convolutional neural network. Additionally, or alternatively, the act 1110 includes generating feature vectors for the plurality of digital fonts using low-level numerical font metrics.

As shown, the series of acts 1100 also includes an act 1120 of jointly learning a symmetric compatibility space and an asymmetric compatibility space. In particular, the act 1120 can involve jointly learning a symmetric compatibility space and an asymmetric compatibility space based on the feature vectors and the indications of the font pairings. In act 1120, the symmetric compatibility space defines a first space in which distances between feature vectors indicate a symmetric compatibility between corresponding digital fonts of a digital font set, and the asymmetric compatibility space defines a second space in which distances between feature vectors indicate an asymmetric compatibility between corresponding digital fonts of the digital font set.

In one or more embodiments, the act 1120 includes generating a pairing indicator function, based on the indications of font pairs within the training font set, the pairing indicator function indicating that two fonts are paired in the training font set; generating a set of negative font pairs, each negative font pair including two digital fonts from the plurality of digital fonts that are not paired based on the indications of font pairs within the training font set; and/or generating, based on the set of negative font pairs, a non-pairing indicator function, which indicates that two fonts are not paired in the training font set; where jointly learning the symmetric compatibility space and the asymmetric compatibility space can be further based on the pairing indicator function and the non-pairing indicator function.

As shown in FIG. 11, the series of acts 1100 further includes an act 1130 of generating a scoring function using the symmetric compatibility space and the asymmetric compatibility space where the scoring function outputs font pairing scores. In particular, the act 1130 can involve generating a scoring function using the symmetric compatibility space and the asymmetric compatibility space that outputs font pairing scores for one or more fonts that indicate how the one or more fonts pair with an input font. In some embodiments, the input font corresponds to a first document section type, the one or more fonts correspond to a second document section type, and the first document section type differs from the second document section type. For example, the first document section type is a document header, and the second document section type is a document sub-header or document body.

The series of acts 1100 can also include a number of additional acts. In one or more embodiments, the series of acts 1100 includes the acts of providing the scoring function, the symmetric compatibility space, and the asymmetric compatibility space to a client device such that the client device can execute the scoring function using the symmetric compatibility space and the asymmetric compatibility space to identify font pairs. In some embodiments, the symmetric compatibility space is a symmetric projection matrix, the asymmetric compatibility space is an asymmetric projection matrix, and the symmetric projection matrix and the asymmetric projection matrix have the same dimensionality.

Figure 12:
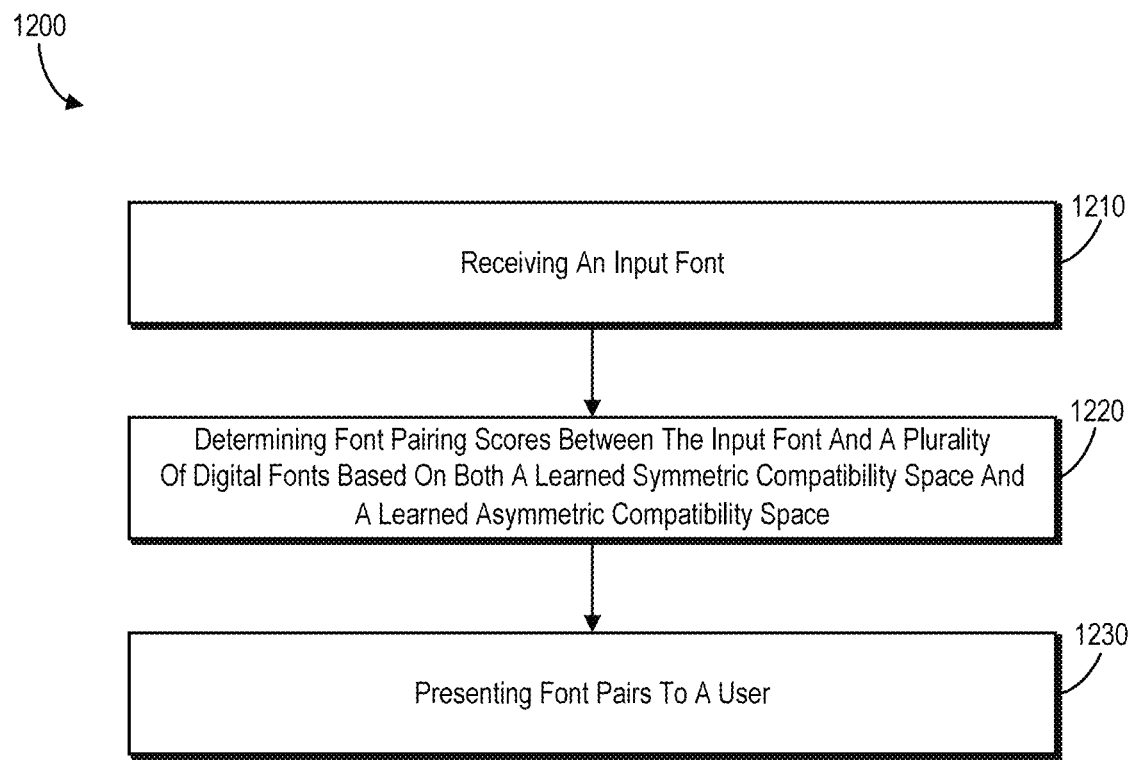
FIG. 12 illustrates a flowchart of a series of acts for determining font pairs based on symmetric and asymmetric compatibility spaces in accordance with one or more embodiments.

As mentioned, FIG. 12 illustrates a flowchart of a series of acts 1200 of determining font pairs based on symmetric and asymmetric compatibility spaces in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions that, when executed by one or more processors, cause a computing device to perform the acts of FIG. 12. In one or more embodiments, a system can perform the acts of FIG. 12. In some embodiments, the series of acts 1200 is implemented by a computing system on one or more computing devices, such as a server device(s) 202 or computing device 800.

As shown, the series of acts 1200 includes an act 1210 of receiving an input font. In one or more embodiments, the act 1210 includes receiving the input font within a graphical user interface associated with an electronic document. In some embodiments, the act 1210 can include determining feature vectors for each of the plurality of digital fonts and storing the feature vectors on a computing system and/or computing device.

The series of acts 1200 also includes an act 1220 of determining font pairing scores between the input font and a plurality of digital fonts based on both a learned symmetric compatibility space and a learned asymmetric compatibility space. In particular, the act 1220 can involve determining font pairing scores between the input font and a plurality of digital fonts by comparing a distance between the input font and each digital font of the plurality of digital fonts in both a learned symmetric compatibility space and a learned asymmetric compatibility space. In act 1220, the learned symmetric compatibility space defines a first space in which distances between feature vectors indicate a symmetric compatibility between digital fonts, and the learned asymmetric compatibility space defines a second space in which distances between feature vectors indicate an asymmetric compatibility between digital fonts.

In some embodiments, the act 1220 includes determining the font pairing scores based on the input font corresponding to a first document section type of an electronic document and each of the plurality of digital fonts corresponding to a second document section for the electronic document. For example, the first document section type is a document body, and wherein the second document section type is a document header or document sub-header. In one or more embodiments, the act 1220 includes determining the font pairing scores using a scoring function that comprises an adaptive constraint threshold.

In addition, the series of acts 1200 includes an act 1230 of presenting font pairs to a user. In particular, the act 1230 can involve presenting, to the user based on the font pairing scores, one or more output fonts that pair with the input font. In some embodiments, the font pairing scores between the input font and each of the plurality of digital fonts are based on the feature vectors determined for each of the plurality of digital fonts.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the asymmetric font pairing system to jointly learn spaces and/or determine font pairs, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
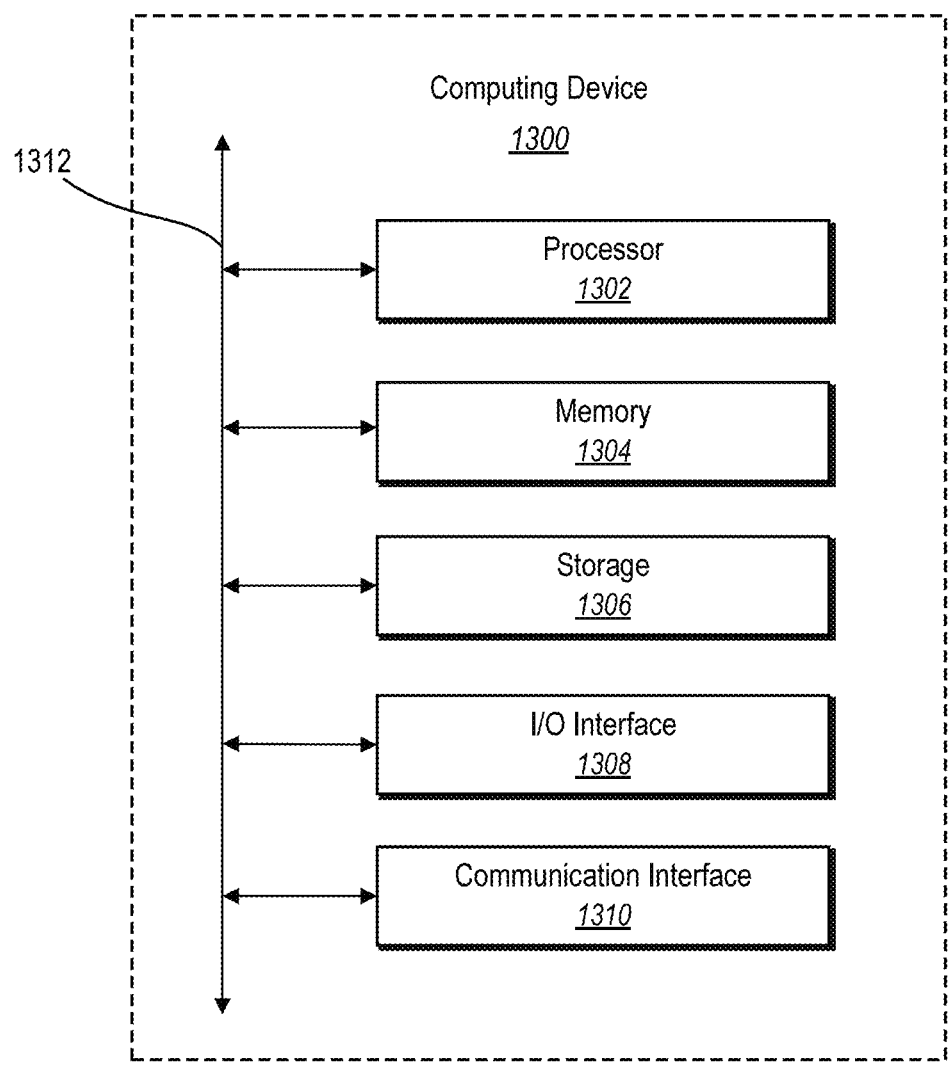
FIG. 13 illustrates a block diagram of an exemplary computing device for implementing one or more embodiments of the present disclosure.

FIG. 13 illustrates a block diagram of an exemplary computing device 1300 that may be configured to perform one or more of the processes described above. One will appreciate that one or more computing devices, such as the computing device 1300 may represent the computing devices described above (e.g., server device(s) 202, client devices 206*a-b*, 500, and computing device 800). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output ("I/O") interfaces 1308, and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
   generate a feature vector for an input font utilizing a font neural network;
   determine a first document section to which the input font corresponds;
   determine a second document section to which an output font corresponds;

determine font pairing scores between the input font and a plurality of digital fonts by comparing a distance between the feature vector of the input font and feature vectors of each digital font of the plurality of digital fonts in both a learned symmetric compatibility space and a learned asymmetric compatibility space, the learned asymmetric compatibility space corresponding to the first document section and the second document section, wherein:
- the learned symmetric compatibility space defines a first space in which distances between feature vectors indicate a symmetric compatibility between digital fonts; and
- the asymmetric compatibility space defines a second space in which distances between feature vectors indicate an asymmetric compatibility between digital fonts; and present, to a user based on the font pairing scores, one or more output fonts that pair with the input font.

2. The non-transitory computer-readable medium of claim 1, wherein a first font pairing score between a first font serving as the input font and a second font differs from a second font pairing score between the second font serving as the input font and the first font.

3. The non-transitory computer-readable medium of claim 1, wherein the instructions, when executed by the at least one processor, cause the computer system to determine the font pairing scores using a scoring function that comprises an adaptive constraint threshold that changes based on the input font and a candidate font from the plurality of digital fonts.

4. The non-transitory computer-readable medium of claim 1, wherein the instructions, when executed by the at least one processor, cause the computer system to receive the input font within a graphical user interface associated with an electronic document.

5. The non-transitory computer-readable medium of claim 1, wherein the instructions, when executed by the at least one processor, cause the computer system to:
- determine the font pairing scores based on the input font residing within a first document section type and each of the plurality of digital fonts residing within a second document section type; and
- determine the font pairing scores between the input font and the plurality of digital fonts further based on the learned asymmetric compatibility space pairing the input font and the first document section type to the plurality of digital fonts and the second document section type.

6. The non-transitory computer-readable medium of claim 5, wherein the first document section type is a document body, and wherein the second document section type is a document header or document sub-header.

7. The non-transitory computer-readable medium of claim 1, further comprising instructions that, when executed by the at least one processor, cause the computer system to:
- determine feature vectors for each of the plurality of digital fonts utilizing the font neural network;
- store the feature vectors on the computer system; and
- wherein the instructions, when executed by the at least one processor, cause the computer system to determine the font pairing scores between the input font and each of the plurality of digital fonts based on the feature vectors determined for each of the plurality of digital fonts utilizing the font neural network.

8. In a digital medium environment for creating or editing electronic documents, a method of pairing and presenting electronic fonts, comprising:
- receiving an input font from a set of digital fonts;
- generating a feature vector for the input font utilizing a font neural network;
- generating feature vectors for the set of digital fonts utilizing the font neural network;
- a step for determining one or more output fonts that pairs with the input font based on the feature vector, the feature vectors, a symmetric projection matrix, and an asymmetric projection matrix; and
- presenting the one or more output fonts that pairs with the input font.

9. The method of claim 8, further comprising generating a scoring function that comprises an adaptive constraint threshold that adapts based on the input font, a given candidate font, and the asymmetric projection matrix.

10. The method of claim 8, wherein:
- the symmetric projection matrix defines a first space in which distances between feature vectors indicate a symmetric compatibility between corresponding digital fonts; and
- the asymmetric projection matrix defines a second space in which distances between feature vectors indicate an asymmetric compatibility between corresponding digital fonts.

11. The method of claim 10, wherein the set of digital fonts differs from digital fonts utilized to learn the symmetric projection matrix and the asymmetric projection matrix.

12. The method of claim 8, wherein the symmetric projection matrix and the asymmetric projection matrix have the same number of dimensions.

13. A system for identifying visually aesthetic font pairs comprising:
- a memory device comprising:
- a learned symmetric compatibility space that defines a first space in which distances between font feature vectors indicate a symmetric compatibility between digital fonts; and
- a learned asymmetric compatibility space that defines a second space in which distances between font feature vectors indicate an asymmetric compatibility between digital fonts; and
- at least one computing device configured to cause the system to:
- generate a feature vector for an input font utilizing a font neural network;
- generate feature vectors for a plurality of digital fonts utilizing the font neural network;
- determine font pairing scores between the input font and the plurality of digital fonts utilizing a scoring function that compares a distance between the feature vector of the input font and feature vectors of each of the plurality of digital fonts in both the learned symmetric compatibility space and the learned asymmetric compatibility space, wherein the plurality of digital fonts differs from digital fonts utilized to learn the symmetric compatibility space and the asymmetric compatibility space; and
- based on the font pairing scores, present digital fonts that pair with the input font.

14. The system of claim 13, wherein the at least one computing device is further configured to cause the system to provide the symmetric compatibility space and the asymmetric compatibility space to a client device such that the client device utilizes the scoring function, the symmetric compatibility space, and the asymmetric compatibility space to identify font pairings from digital fonts stored on the client device, wherein the digital fonts stored on the client device differ from the digital fonts utilized to learn the symmetric compatibility space and the asymmetric compatibility space.

15. The system of claim 13, wherein:
the input font corresponds to a first document section type; and
the digital fonts that pair with the input font correspond to a second document section type that differs from the first document section type.

16. The system of claim 15, wherein the at least one computing device is further configured to cause the system to determine the font pairing scores between the input font and the plurality of digital fonts further based on the learned asymmetric compatibility space pairing the input font and the first document section type to the plurality of digital fonts and the second document section type.

17. The system of claim 15, wherein the at least one computing device is further configured to cause the system to provide a graphical user interface to a client device that displays font pairings comprising the input font paired with a paired digital font from the digital fonts that pair with the input font.

18. The system of claim 17, wherein the at least one computing device is further configured to cause the system to format the font pairings within the graphical user interface based on document section types, wherein the input font is formatted for the first document section and the paired digital font is formatted for the second document section.

19. The system of claim 13, wherein sizes of the symmetric compatibility space and asymmetric compatibility space are unaffected by a number of the plurality of digital fonts.

20. The system of claim 15, wherein:
the first document section type is a document header;
the second document section type is a document subheader or document body;
the symmetric compatibility space is a symmetric projection matrix;
the asymmetric compatibility space is an asymmetric projection matrix; and
the symmetric projection matrix and the asymmetric projection matrix have the same dimensionality.

* * * * *